(12) United States Patent
Weng

(10) Patent No.: US 6,410,066 B1
(45) Date of Patent: Jun. 25, 2002

(54) CONTROLLER AND METHOD FOR ADMINISTERING AND PROVIDING ON-LINE HANDLING OF DEVIATIONS IN A CONTINUOUS OVEN COOKING PROCESS

(75) Inventor: Zhijun Weng, Fresno, CA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/560,637

(22) Filed: Apr. 28, 2000

Related U.S. Application Data

(63) Continuation-in-part of application No. 09/188,531, filed on Nov. 6, 1998, and a continuation-in-part of application No. 09/187,915, filed on Nov. 6, 1998.

(51) Int. Cl.[7] .......................... A01K 43/00; G01N 33/02
(52) U.S. Cl. .......................... 426/231; 426/233; 99/325; 99/326; 99/328
(58) Field of Search ................................ 426/231, 233; 99/325, 326, 328

(56) References Cited

U.S. PATENT DOCUMENTS

| | | | |
|---|---|---|---|
| 3,326,692 A | | 6/1967 | Martino et al. |
| 4,345,145 A | * | 8/1982 | Norwood ............... 219/492 |
| 4,437,159 A | | 3/1984 | Wangh |
| 4,608,260 A | | 8/1986 | Andre |
| 4,668,856 A | | 5/1987 | Axelson |
| 4,767,629 A | | 8/1988 | Iglesias et al. |
| 4,801,466 A | | 1/1989 | Clyne et al. |

(List continued on next page.)

FOREIGN PATENT DOCUMENTS

| | | |
|---|---|---|
| EP | 0302306 | 2/1989 |
| EP | 0497546 | 8/1992 |

OTHER PUBLICATIONS

Ball, C. O., "Foundation of Food Process Calculation Methods", Sterilization in Food Technology, 124–125.

Ball, C. O., et al., "Heating Curve–Simple Logarithmic Temperature Rise", in *Sterilization in food technology, Theory, Practice and Calculations*, Chap. 12:313–329.

Bichier et al., "Thermal Processing of canned foods under mechanical agitation,"29th National Heat Transfer Conference, Atlanta, GA, Aug. 8–11, 1993, American Society of Mechanical Engineers Heat Transfer Division, abstract (1993).

(List continued on next page.)

*Primary Examiner*—Nina Bhat
(74) *Attorney, Agent, or Firm*—Flehr Hohbach Test Albritton & Herbert LLP

(57) ABSTRACT

A continuous oven cooking system, a controller for use in the continuous oven cooking system, and a method performed by the controller are disclosed. The system, controller, and method are used to administer a continuous oven cooking process performed on a line of food items and provide on-line handling of a deviation in a specific scheduled parameter during the process. In addition to the controller, the continuous oven cooking system includes a oven. The controller controls the oven in performing the process according to scheduled parameters. When a deviation in the specific scheduled parameter occurs, the controller identifies those of the food items that in response will have (a) an accumulated lethality predicted to be delivered to them during the continuous oven cooking process that is less than a target lethality, or (b) have a core temperature at the end of the continuous oven cooking process that is less than a target core temperature. The specific scheduled parameter may be a scheduled environment temperature, scheduled air circulation velocity, or scheduled relative humidity in a cooking zone of the oven through which the line of containers is conveyed. It also may be a scheduled initial core temperature for the food items or a scheduled belt speed for a belt conveying the containers in line through the oven.

19 Claims, 12 Drawing Sheets

U.S. PATENT DOCUMENTS

| | | | |
|---|---|---|---|
| 4,849,235 A | | 7/1989 | Braymand |
| 4,962,299 A | | 10/1990 | Duborper et al. |
| 5,062,066 A | | 10/1991 | Scher et al. |
| 5,094,864 A | * | 3/1992 | Pinon et al. ............... 426/233 |
| 5,111,028 A | | 5/1992 | Lee |
| 5,277,104 A | * | 1/1994 | Colaner ...................... 99/331 |
| 5,378,482 A | | 1/1995 | Kersten et al. |
| 5,410,129 A | | 4/1995 | Kersten et al. |
| 5,466,417 A | | 11/1995 | Seki ........................... 422/109 |
| 5,526,736 A | | 6/1996 | Buriani et al. |
| 5,529,931 A | * | 6/1996 | Naryan .................... 435/287.4 |
| 5,596,514 A | | 1/1997 | Maher, Jr. et al. |
| 5,619,911 A | * | 4/1997 | Voegtlin .................. 99/433 C |
| 5,652,006 A | | 7/1997 | Assinder et al. |
| 5,681,496 A | | 10/1997 | Brownlow et al. |
| 5,826,496 A | * | 10/1998 | Jara ......................... 99/433 C |
| 5,827,556 A | | 10/1998 | Meher, Jr. |
| 5,888,566 A | * | 3/1999 | Alcaraz ..................... 426/233 |
| 5,893,051 A | | 4/1999 | Tomohiro |
| 5,981,916 A | | 11/1999 | Griffiths et al. |
| 6,153,860 A | | 11/2000 | Weng |

OTHER PUBLICATIONS

Chang, S. Y., et al., "Heat Transfer and Simulated Sterilization of Particulate Solids in a Continuously Flowing System", *J. Food Sci.*, vol. 54(4):1017–1023 & 1030 (1989).

Clausing, A. M., "Numerical Methods in Heat Transfer", lectures on advanced heat transfer, 157–181 (1989).

Datta, A. K., et al., "Computer–based Retort Control Logic for On–Line Correction of Process Deviations", *J. Food Sci.*, 51(2):480–483 & 507 (1986).

Denys, S., et al., "Evaluation of Process Deviations, Consisting of Drops in Rotational Speed, during Thermal Processing of Foods in Rotary Water Cascading Retorts", *J. Food Engg.*, 30:327–338 (1996).

Downing, D.L., "Canning of Marine Products", *A Complete Course in Canning and Related Processes, Book III*, p. 249, CTI Publications, Inc., Baltimore, MD (1996).

Erdoğdu, F., et al., "Modeling of Heat Conduction in Elliptical Cross Section: I. Development and Testing of the Model", *Journal of Food Engineering*, vol. 38, pp. 223–239, (1998).

Fastag, J., et al., "Variable Control of a Batch Retort and Process Simulation for Optimization Studies", *J. of Food Process Engg.*, 19:1–14 (Nov. 1996).

FMC FoodTech, "NumeriCAL *On–Line*™ for Batch Retorts . . ." (1997).

FMC FoodTech, "FMC's NumeriCAL™ v.2.09" (1995).

FMC FoodTech, "FMC's NumeriCAL™ Model 101 Software" (1995).

FMC FoodTech, "BatchCAL™ Thermal Processing Software" (1995).

Giannoni–Succar, E. B., et al., "Correction Factor of Deviant Thermal Processes Applied to Packaged Heat Conduction Food", repr. from *J. Food Sci.*, 47(2):642–646 (1982).

Gill et al., "Computerized Control Strategies for a Steam Retort," Journal of Food Engineering, 10:135–154 (1989).

Hayakawa, K., "Estimating Heat Processes in Canned Foods", *Ashrae Journal*, 17(9):36–37 (Sep. 1975); Author corrects errors, *Food Technol.*, 29(2):70 (1975).

Hayakawa, K., "Experimental Formulas for Accurate Estimation of Transient Temperature of Food and Their Application to Thermal Process Evaluation", repr. from *Food Technology*, 24(12):89–99 (1970).

Lanoiselle, J.–L., et al., "Predicting Internal Temperature of Canned Foods During Thermal Processing using a Linear Recursive Model", *J. Food Sci.*, 60(4):833–840 (1995).

Larkin, J. W., et al., "Experimental Errors Associated with the Estimation of Thermal Diffusivity from Thermal Process Data", *J. Food Sci.*, 52(2):419–428 (1987).

Manson, J. E., "Evaluating Complex Deviations–Hydrostatic Sterilizers", *TechniCAL, Inc.*, Chap. 12: 12.1–12.4.

Manson, J. E., "Evaluation of Lethality and Nutrient Retentions of Conduction–Heating Foods in Rectangular Containers", *Food Technology*, 24(11):109–113 (1970).

McConnell, J.E.W., "Effect of a Drop in Retort Temperature Upon the Lethality of Processes for Convection Heating Products", *Food Tech.*, 76–78 (Feb. 1952).

Navankasattusas, S., et al., "Monitoring and Controlling Thermal Processes by On–Line Measurement of Accomplished Lethality", *Food Technology*, 79–83 (Mar. 1978).

Press, W. H., et al., "Parabolic Interpolation and Brent's Method in One Dimension", Chap. 10.2, Minimization or Maximization of Functions, 395–398.

Simpson, R., et al., "Computer Control of Batch Retort Process Operations", Food Processing Automation Conference (Proceedings), FPEI, ASAE, Lexington, KY (May 6–8, 1991).

Teixeira, A. A., et al., "Computer Optimization of Nutrient Retention in the Thermal Processing of Conduction–Heated Foods", *Food Technology*, vol. 23(845):137–142 (Jun. 1969).

Teixeira, A. A., et al., "Computer Control of Batch Retort Operations with On–Line Correction of Process Deviations", *Food Technology*, 85–90 (Apr. 1982).

Teixeira et al., "On–Line retort control in Thermal Sterilization of canned foods," Food Control, 8(1): 13–20 (1997).

Teixeira, A. A., "Innovative Heat Transfer Models: From Research Lab to On–Line Implementation", *Food Processing Automation II*, proceedings of the 1992 FPEI Conference, 177–184 (May 4–6, 1992).

Weng, Z., et al., "Process Deviation Analysis of Conduction–Heating Canned Foods Processed in a Hydrostatic Sterilizer Using a Mathematical Model", *Journal Food Processing Automation IV*, vol. 41(6):368–379 (1995).

Weng et al. "Computer Control of a Hydrostatic Sterilizer Operations with On–Line Correction of Process Deviations," Presentation Slides, IFT '96, New Orleans, Jun. 23, 1996.

Weng, Z., et al., "The Use of a Time–Temperature–Integrator in Conjuction with Mathematical Modelling for Determining Liquid/Particle Heat Transfer Coefficients", *J. Food Engg.*, 16:197–214 (1992).

Weng, Z., U.S. application No. 09/187,333, "Controller and Method for Administering and Providing On–Line Correction of a Batch Sterilization Process".

Weng, Z., U.S. application No. 09/188,531, "Controller and Method for Administering and Providing On–Line Handling of Deviations in a Rotary Sterilization Process".

Weng, Z., U.S. application No. 09/187,915, "Controller Method for Administering and Providing On–Line Handling of Deviations in a Hydrostatic Sterilization".

Weng et al., "Computer Control of a Hydrostatic Sterilizer Operations with On–Line Correction of Process Deviations," IFT '96, New Orleans, abstract, Jun. 23, 1996.

Young, K. E., et al., "Predicting Product Lethality in Hydrostatic Retorts", vol. 50:1467–1472 (1985).

Young, K. E., et al., "Product Temperature Prediction in Hydrostatic Retorts", *Transactions of the ASAE*, vol. 26(1):316–320 (1983).

Zhao, Y., et al., "Computer Simulation on Onboard Chilling and Freezing of Albacore Tuna", *Journal of Food Science*, vol. 63, No. 5, pp. 751–755, (1998).

Fahloul et al., "Measurements and Predictive Modelling of Heat Fluxes in Continuous Baking Ovens," Journal of Food Engineering, 26:469–479 (1995).

Huang et al., "Meatball Cooking–Modeling and Simulation," Journal of Food Engineering, 24:87–100 (1995).

Wang et al., "A Mathematical Model of Simultaneous Heat and Moisture Transfer during Drying of Potato," Journal of Food Engineering, 24:47–60 (1995).

Chen et al., "Modeling coupled heat and mass trasfer for convection cooking of chicken patties," Journal of Food Engineering, 42:139–146 (1999).

Chang et al., "Modeling Heat Transfer During Oven Roasting of Unstuffed Turkeys," Journal of Food Science, 63(2):257–261 (1998).

* cited by examiner

CONTROLLER AND METHOD FOR ADMINISTERING AND PROVIDING ON-LINE HANDLING OF DEVIATIONS IN A CONTINUOUS OVEN COOKING PROCESS

REFERENCE TO RELATED APPLICATIONS

This is a continuation-in-part application of U.S. patent applications Nos. 09/188,531 and 09/187,915, filed on Nov. 6, 1998, and respectively entitled "CONTROLLER AND METHOD FOR ADMINISTERING AND PROVIDING ON-LINE HANDLING OF DEVIATIONS IN A ROTARY STERILIZATION PROCESS" and "CONTROLLER AND METHOD FOR ADMINISTERING AND PROVIDING ON-LINE HANDLING OF DEVIATIONS IN A HYDROSTATIC STERILIZATION PROCESS". These applications are hereby explicitly incorporated by reference.

TECHNICAL FIELD OF THE INVENTION

The present invention generally pertains to the field of continuous oven cooking systems for performing continuous oven cooking processes on continuous lines of food items. In particular, it pertains to a controller for such a system that provides on-line handling of a deviation in a scheduled parameter during the continuous oven cooking process by identifying any food items that will be under cooked as a result of the deviation.

BACKGROUND OF THE INVENTION

A continuous oven cooking system is a continuous source food processing system. This system is widely used in the food preparation industry to cook food items, particularly meat items, in mass quantities. Such a system includes an oven through which a continuous line of the same type of food items $\{1, \ldots, i, \ldots, I\}_{line}$ is conveyed by a belt. The oven includes one or more zones to cook the food items. Each zone may have a corresponding scheduled environment temperature, a corresponding scheduled air circulation velocity, and a corresponding scheduled relative humidity. The belt has a scheduled belt speed for conveying the food items through the oven.

Each food item i must be commercially cooked during the continues oven cooking process in such a way that is free from pathogens, such as *E. coli, Listeria monocytogens,* and *Salmonella* spp. Under USDA (U.S. Department of Agriculture) and/or FDA (Food and Drug Administration) regulations, this can be achieved using one or both of two different approaches.

The first approach is to ensure that the final core temperature $T_c(t_{e,i})_i$ of each food item i satisfies a target core temperature $T_{targ}$ when the food item exits the oven. Here, $t_{e,i}$ is the end time when the food item exits the oven. The target core temperature is set by the USDA and/or the FDA.

The second approach is to ensure that the accumulated lethality $F_i$ delivered to each food item i over the time interval $[t_{b,i}, t_{e,i}]$ satisfies a target lethality $F_{targ}$. Here, $t_{b,i}$ is the begin time when the food item enters the oven. The target lethality is also set by the USDA and/or the FDA. The belt speed and the cooking temperatures in the oven are then scheduled so that each food item will have a scheduled temperature-time profile that delivers an accumulated lethality to the core of the food item which satisfies the target lethality.

As is well known, the accumulated lethality $F_i$ delivered to a food item $F_i$ over a particular time interval $[t_{k,i}, t_{m,i}]$ is given by:

$$F_i = \int_{t_{m,i}}^{t_{k,i}} 10^{(T_c(t)_i - T_{REF})/z} dt \qquad (1)$$

where $t_{m,i}$ and $t_{k,i}$ are respectively the begin and end times of the time interval $[t_{m,i}, t_{k,i}]$, $T_c(t)_i$ is the core temperature-time profile for the core of the food item i, z is the thermal characteristic of particular pathogens to be destroyed during the time interval $[t_{m,i}, t_{k,i}]$, and $T_{REF}$ is a reference temperature for destroying the pathogens. Thus, for each food item i being cooked, the accumulated lethality $F_i$ delivered to the core of the food item i over the actual time interval $[t_{b,i}, t_{e,i}]$ while in the oven is given by this lethality equation, where $t_{b,i}=t_m$ and is the begin time when the food item enters the oven and $t_{e,i}=t_k$ is the end time when the food item leaves the oven.

The belt speed and the cooking temperatures are scheduled off-line (i.e., prior to the start of the continuous oven cooking process) based on the target temperature $T_{targ}$ and/or the target lethality $F_{targ}$. This provides a scheduled temperature-tune profile for each food item i that results in the final core temperature $T_c(t_{e,i})_i$ of the food item at the end time $t_{e,i}$ satisfying the target temperature and/or that results in an accumulated lethality $F_i$ over $[t_{b,i}, t_{e,i}]$ being delivered to the food item that satisfies the target lethality.

However, it is common to have a process deviation during a continuous oven cooking process. This may occur when the actual cooking temperature, the actual air circulation velocity, and/or the actual relative humidity in a zone of the oven drops below the corresponding scheduled cooking temperature, the scheduled air circulation velocity, and/or the scheduled relative humidity for the zone. Such a deviation will effect the fmal core temperature $T_c(t_{e,i})_i$ of each food item i in the zone since this temperature is dependent on the actual environment temperature, the actual air circulation velocity, and the actual relative humidity. Furthermore, the accumulated lethality $F_i$ over $[t_{b,i}, t_{e,i}]$ delivered to each food item i is also effected since, as is evident from Eq. (1) given earlier, this lethality is based on the core temperature of the food item.

Since each food item i in a continuous oven cooking process will have a unique temperature-time profile, the final core temperature $T_c(t_{e,i})_i$ and the accumulated lethality $F_i$ over $[t_{b,i}, t_{e,i}]$ is different for each food item i. This makes it difficult to identify, while on-line and in real time, each food item that will have a final core temperature below the target core temperature $T_{targ}$ and/or each food item that will have a predicted minimum total lethality delivered to it that is below the target total lethality $F_{targ}$. As a result, the development of a controller that provides on-line handling of deviations in a continuous oven cooking process without stopping the belt of the oven has to date not been developed.

SUMMARY OF THE INVENTION

In summary, the present invention comprises a continuous oven cooking system, a controller for use in the continuous oven cooking system, and a method performed by the controller. The system, controller, and method are used to administer a continuous oven cooking process performed on a line of food items and provide on-line handling of a deviation in a scheduled parameter during the process. In addition to the controller, the continuous oven cooking system includes an oven through which the food items are conveyed.

The controller controls the oven in performing the continuous oven cooking process according to scheduled parameters. When a deviation below a specific scheduled parameter occurs, the controller identifies those of the food items that will in response have (a) an accumulated lethality predicted to be delivered to them during the continuous oven cooking process that is less than a target lethality, or (b) have a core temperature at the end of the continuous oven cooking process that is less than a target core temperature. This specific scheduled parameter may be a scheduled environment temperature, scheduled air circulation velocity, or scheduled relative humidity in a cooking zone of the oven through which the line of containers is conveyed. It also may be a scheduled initial core temperature for the food items or a scheduled belt speed for a belt conveying the containers in line through the oven.

BRIEF DESCRIPTION OF THE DRAWINGS

FIG. 6 is a detailed process flow diagram for a step of the overall process flow diagram of FIG. 3 for defining an initially scheduled belt speed.

FIG. 7 is a detailed process flow diagram for a step of the overall process flow diagram of FIG. 3 for computing an estimated accumulated lethality over an actual time interval.

FIG. 8 is a detailed process flow diagram for a step of the overall process flow diagram of FIG. 3 for computing a currently predicted accumulated lethality over a currently scheduled time interval.

FIG. 9 is a detailed process flow diagram for a step of the overall process flow diagram of FIG. 3 for re-defining a currently scheduled belt speed.

DETAILED DESCRIPTION OF THE INVENTION

1. Exemplary Embodiment

Figure 1:
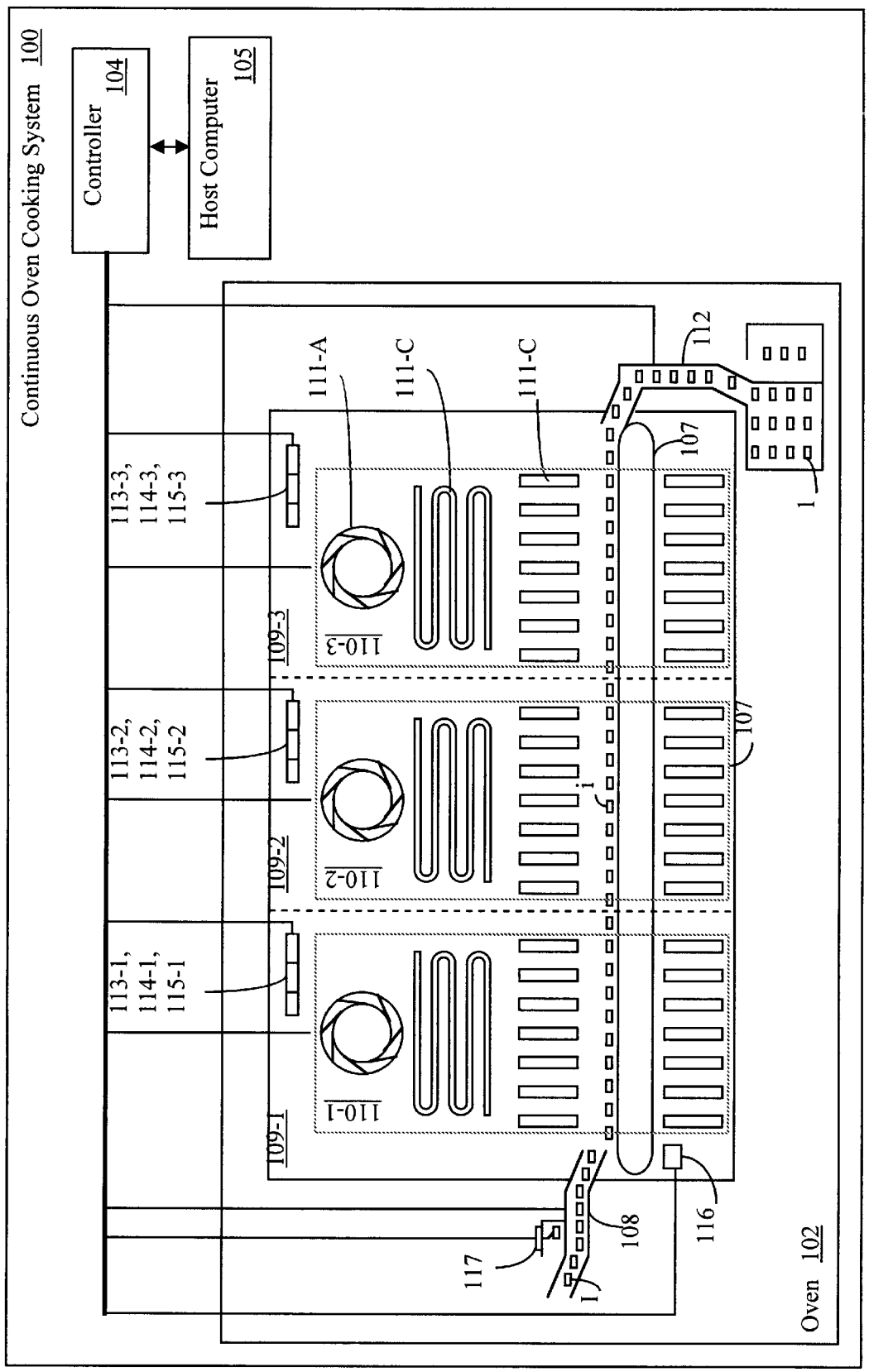
FIG. 1 is a block diagram of a continuous oven cooking system in accordance with the present invention.

Referring to FIG. 1, there is shown an exemplary embodiment of a continuous oven cooking system 100 for performing a continuous oven cooking process on a continuous line of food items $\{1, \ldots, i, \ldots, I\}_{line}$. The system 100 comprises an oven 102, a programmed controller 104, and a host computer 105.

The oven 102 comprises a chamber 106, a belt 107, and a feed device 108. The feed device feeds the food items $\{1, \ldots, i, \ldots, I\}_{line}$ in a continuous line into the chamber and onto the belt. The feed device is configured to prevent the escape of heat from the chamber while loading the food items onto the belt.

The food items $\{1, \ldots, i, \ldots, I\}_{line}$ are then conveyed in a continuous line through the chamber 106 by the belt 107. The oven 102 is configured with multiple cooking zones 109-1, 2, and 3 in the chamber. The food items are cooked in the cooking zones 109-1, 2, and 3 according to corresponding initially scheduled environment temperatures $T_{se1}^0$, $T_{se2}^0$, and $T_{se3}^0$, corresponding initially scheduled air circulation velocities $V_{scir1}^0$, $V_{scir2}^0$, and $V_{scir3}^0$, and corresponding initially scheduled relative humidities $RH_{s1}^0$, $RH_{s2}^0$, and $RH_{s3}^0$. In order to do so, the oven comprises corresponding heat mechanisms 110-1, 2, and 3 for the cooking zones 109-1, 2, and 3. Each heat mechanism comprises a radiator 111-A, a fan 111-B, and air circulation slots 111-C. The radiator transfers heat and humidity to the air and the fan circulates the air through the air circulations slots. This is controlled by the controller 104 according to the initially scheduled cooking temperature, air circulation velocity, and relative humidity for the corresponding cooking zone.

The oven 102 also comprises a discharge device 112. The discharge device discharges the food items $\{1, \ldots, i, \ldots, I\}_{line}$ in a continuous line from the chamber 106. In doing so, the discharge device off-loads the food items from the belt 107. Like the feed device 108, the discharge device is configured to prevent the escape of heat from the chamber while the food items are being off-loaded.

The oven 102 further comprises corresponding temperature sensors 113-1, 2, and 3, corresponding air circulation velocity sensors 114-1, 2, and 3, and corresponding relative humidity sensors 115-1, 2, and 3 for the cooking zones 109-1, 2, and 3. At each sample real time $t_r$ (e.g., every 0.1 to 1 seconds) of the continuous oven cooking process, the temperature sensors 113-1, 2, and 3 respectively sense the actual environment temperatures $T_{ae1}(t_r)$, $T_{ae2}(t_r)$, and $T_{ae3}(t_r)$ in the corresponding cooking zones 109-1, 2, and 3. Similarly, the air circulation velocity sensors 114-1, 2, and 3 respectively sense the actual air circulation velocities $V_{acir1}(t_r)$, $V_{acir2}(t_r)$, and $V_{acir3}(t_r)$ in the corresponding cooking zones 109-1, 2, and 3 at each sample real time $t_r$. And, the relative humidity sensors 115-1, 2, and 3 respectively sense the actual relative humidities $RH_{a1}(t_r)$, $RH_{a2}(t_r)$, and $RH_{a3}(t_r)$ in the corresponding cooking zones 109-1, 2, and 3 at each sample real time $t_r$.

The oven 102 additionally comprises a belt speed sensor 116 and an initial temperature sensor 117. The belt speed sensor 116 senses the actual belt speed $v_{abelt}(t_r)$ of the belt 107 at each sample real time $t_r$. The initial temperature sensor 117 is located in the feed device 108 and is periodically (e.g., every 20 to 30 minutes or as often as required) inserted into one of the food items $\{1, \ldots, i, \ldots, I\}_{line}$ currently being fed into the chamber 106. The initial temperature sensor then senses the actual initial core temperature $T_{ai}(t_r)$ in that food item at that particular sample real time $t_r$.

The controller 104 administers the continuous oven cooking process by controlling the oven 102 and providing on-line handling of any temperature deviations during the process. This is done in response to the actual environment temperatures $T_{ae1}(t_r)$, $T_{ae2}(t_r)$, and $T_{ae3}(t_r)$, the actual air circulation velocities $V_{acir1}(t_r)$, $V_{acir2}(t_r)$, and $V_{acir3}(t_r)$, and the actual relative humidities $RH_{a1}(t_r)$, $RH_{a2}(t_r)$, and $RH_{a3}(t_r)$ sensed by the sensors 113-1, 2, and 3, 114-1, 2, and 3, and 115-1, 2, and 3 at each sample real time $t_r$. This is also done in response to the actual belt speed $v_{abelt}(t_r)$ sensed by the sensor 116 at each sample real time $t_r$ and the actual initial core temperature $T_{aI}(t_r)$ periodically sensed by the sensor 117.

The host computer 105 is used to provide input information, namely input parameters and software, used by the controller 104 in administering the continuous oven cooking process. The host computer is also used to receive, process, and display output information about the process which is generated by the controller.

1.a. Hardware and Software Configuration of Controller 104

Figure 2:
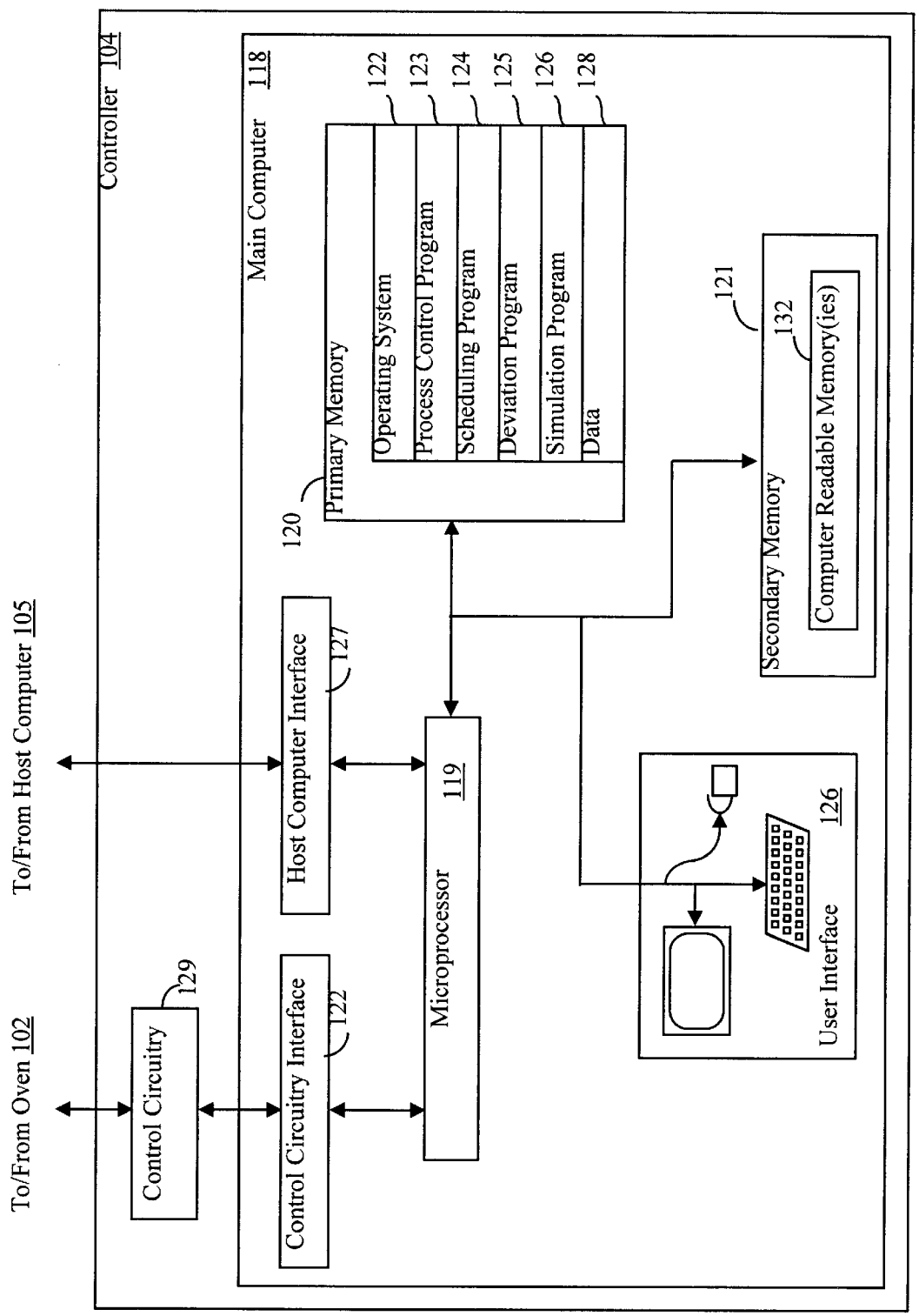
FIG. 2 is a block diagram of a controller of the continuous oven cooking system of FIG. 1.

Turning to FIG. 2, the controller 104 comprises a main control computer 118 that includes a microprocessor (i.e., CPU) 119, a primary memory 120, and a secondary memory 121. The microprocessor executes an operating system 122, a process control program 123, a process scheduling program 124, a deviation program 125, and a simulation program 126 of the controller. The operating system and programs are loaded from the secondary memory into the primary memory during execution.

The operating system 122 and the programs 123 to 126 are executed by the microprocessor 119 in response to commands issued by the operator. These commands may be issued with a user interface 133 of the main control computer 118 and/or the host computer 105 via ahost computer interface 127 of the controller 104. The operating system controls and coordinates the execution of the other programs. Data 128 generated by the operating system and programs during execution and data 128 inputted by the operator is stored in the primary memory. This data includes input information provided by the operator with the user interface and/or the host computer via the host computer interface. It also includes output information provided to the user interface or the host computer via the host computer interface that is to be displayed to the operator.

The controller 104 also comprises control circuitry 129. The control circuitry includes circuits, microprocessors, memories, and software to administer the continuous oven cooking process by generating control signals that control the sequential operation of the oven 102. As alluded to earlier, the software may be downloaded from the host computer 105 and provided to the control circuitry by the process control program 123. The control signals are generated in response to commands generated by this program and issued to the control circuitry from the microprocessor 119 via a control circuitry interface 130 of the main control computer 118.

Furthermore, at each sample real time $t_r$ of the continuous oven cooking process, the control circuitry 129 receives sensor signals from the sensors 113-1, 2, and 3, 114-1, 2, and 3, and 115-1, 2, and 3, 116, and 117 that represent the actual environment temperatures $T_{ae1}(t_r)$, $T_{ae1}(t_r)$, and $T_{ae3}(t_r)$, the actual air circulation velocities $V_{acir1}(t_r)$, $V_{acir2}(t_r)$, and $V_{acir3}(t_r)$, the actual relative humidities $RH_{a1}(t_r)$, $RH_{a2}(t_r)$, and $RH_{a3}(t_r)$ the actual belt speed $v_{abelt}(t_r)$, and the actual initial core temperature $T_{aII}(t_r)$. The control circuitry generates the control signals for controlling the oven 102 in response to these sensed parameters. These sensed parameters are also provided to the microprocessor 119 via the control circuitry interface 130 and recorded by the process control program 123 as data 128 in the primary memory 120. In this way, the process control program compiles and records in the primary memory 120 actual environment temperature-time profiles $T_{ae1}(t)$, $T_{ae2}(t)$, and $T_{ae3}(t)$, actual air circulation velocity-time profiles $V_{acir1}(t)$, $V_{acir2}(t)$, and $V_{acir3}(t)$ and actual relative humidity-time profiles $RH_{a1}(t)$, $RH_{a2}(t)$, and $RH_{a3}(t)$ for the corresponding cooking zones 109-1, 2, and 3 and an actual belt speed-time profile $v_{abelt}(t)$ and an actual initial core temperature-time profile $T_{aI}(t)$. These profiles are used in the manner described later for providing on-line handling of temperature deviations during the continuous oven cooking process.

The sensors 113-1, 2, and 3, 114-1, 2, and 3, and 115-1, 2, and 3 are preferably located in the slowest heating regions of the cooking zones 109-1, 2, and 3 to provide conservative estimates of the actual environment temperatures $T_{ae1}(t_r)$, $T_{ae2}(t_r)$, and $T_{aT3}(t_r)$, the actual air circulation velocities $V_{acir1}(t_r)$, $V_{acir2}(t_r)$, and $V_{acir3}(t_r)$, and the actual relative humidities $RH_{a1}(t_r)$, $RH_{a2}(t_r)$, and $RH_{a3}(t_r)$. However, if this is not possible, the process control program 123 may adjust the temperatures, velocities, and relative humidities provided by the sensors to estimate the actual temperatures, velocities, and relative humidities at the slowest heating regions. This adjustment would be done according to temperature distribution data 128 in the primary memory 120 generated from heating temperature distribution tests conducted on the cooking zones.

As mentioned earlier, the operating system 122 and the other programs 123 to 126 are normally stored in the secondary memory 121 and then loaded into the primary memory 120 during execution. The secondary memory comprises one (or multiple) computer readable memory(ies) 132 that is(are) readable by the main control computer 118 of the controller 104. The computer readable memory(ies) is(are) therefore used to direct the controller in controlling the continuous oven cooking process. The computer readable memory(ies) may comprise a computer program product, such as a PROM (programmable read only memory), a magnetic storage disc, and/or CD ROM storage disc that stores the operating system and/or the other programs. In the case of a magnetic or CD ROM storage disc, the secondary memory would include a magnetic or CD ROM storage disk drive to read the magnetic or CD ROM storage disc. Moreover, the operating system and/or the other programs could also be downloaded to the computer readable memory(ies) or the primary memory from the host computer 105 via the host computer interface 127.

1.b. Overall Process Flow

Figure 3A:
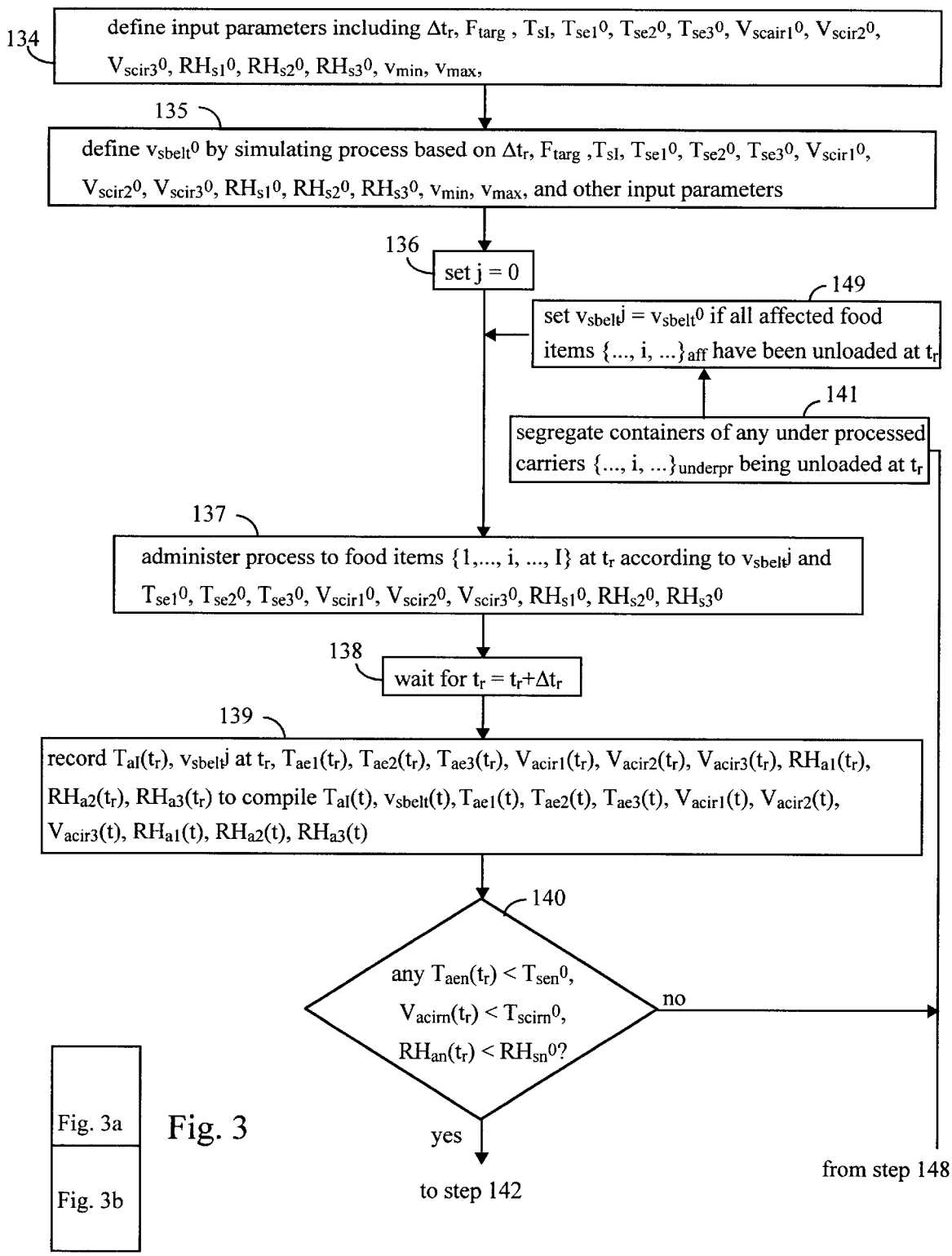
FIG. 3 is an overall process flow diagram for the controller of FIG. 2 in controlling a continuous oven cooking process performed by the continuous oven cooking system of FIG. 1.
Figure 3B:
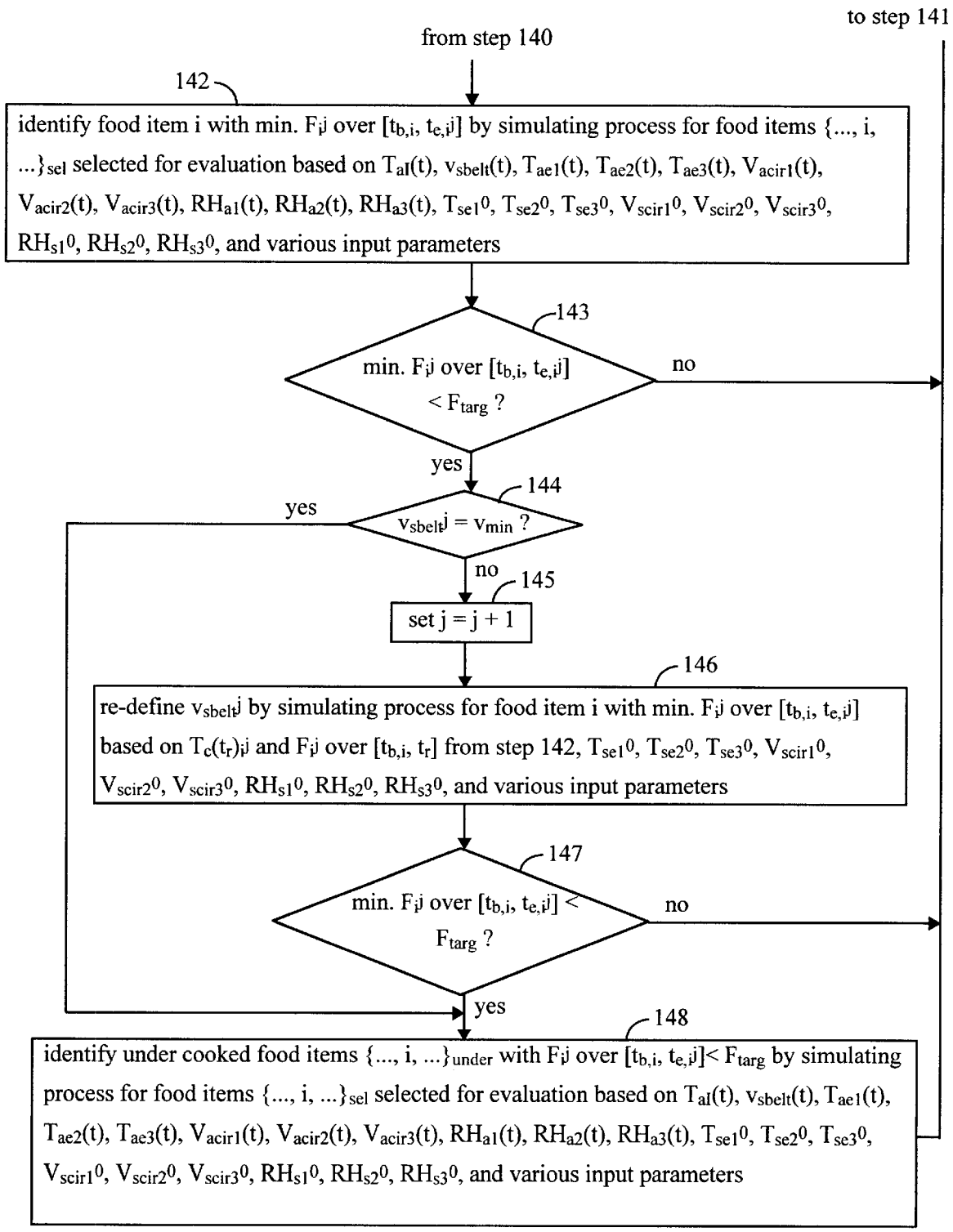

The controller 104 of FIGS. 1 and 2 controls the continuous oven cooking process according to the overall process flow of FIG. 3. In the first step 134, the input parameters $\Delta t_r$, S, k, $C_p$, $\rho$, $L_v$, $\mu$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, z, $T_{REF}$, $F_{targ}$, $T_{sI}$, $T_{se1}^0$, $T_{se2}^0$, $T_{se3}^0$, $V_{scir1}^0$, $V_{scir2}^0$, $V_{scir3}^0$, $RH_{s1}^0$, $RH_{s2}^0$, $RH_{s3}^0$, $v_{min}$, $v_{max}$, $L_1$, $L_2$, $L_3$, $W_1$, $W_2$, and $W_3$ for the continuous oven cooking process are defined and provided to the controller.

$\Delta t_r$ is the predefined sampling time period for each real time increment $[t_r-\Delta t, t_r]$ from the previous sample real time $t_r-\Delta t_r$ to the current sample real time $t_r$ during the process. This time period may range from 0.1 to 1 seconds.

S is the typical (or average) size information (such as thickness, length, and width) for the food item type of the food items $\{1, \ldots, i, \ldots, I\}_{line}$ being cooked. These input parameters may be manually measured by the operator before the food items are cooked in the continuous oven cooking process.

k, $C_p$, $\rho$, and $L_v$ are respectively the typical thermal conductivity, specific heat capacity, density, and latent heat of vaporization for the food item type of the food items {1, ..., i, ..., I}$_{line}$ being cooked. These input parameters are predetermined using well known techniques.

$\mu$ is the viscosity of the air being circulated in the cooking zones 109-1, 2, and 3 (of FIG. 1). This is a well known parameter to those skilled in the art.

A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, are constants. The values for these constants depends on the type of oven 102 (of FIG. 1) being used and may be obtained experimentally by conducting tests on the oven.

The input parameters additionally include some earlier discussed items. Specifically, they include the thermal characteristic z for destroying particular pathogens and the associated reference temperature $T_{REF}$. They also include the target lethality $F_{targ}$ and the initially scheduled initial core temperature $T_{sI}$, initially scheduled environment temperatures $T_{se1}{}^0$, $T_{se2}{}^0$, and $T_{se3}{}^0$, initially scheduled air circulation velocities $V_{scir1}{}^0$, $V_{scir2}{}^0$, and $V_{scir3}{}^0$, and initially scheduled relative humidities $RH_{s1}{}^0$, $RH_{s2}{}^0$, and $RH_{s3}{}^0$.

Finally, $v_{min}$ and $v_{max}$ are the minimum and maximum belt speeds for the belt 107 (of FIG. 1), $L_1$, $L_2$, and $L_3$ are the length information for the corresponding cooking zones 109-1, 2, and 3 (of FIG. 1), respectively, and $W_1$, $W_2$, and $W_3$ are respectively the width information for the corresponding cooking zones 109-1, 2, and 3. These input parameters are particular to the oven 102 of FIG. 1 being used and are predetermined by the operator of the oven.

In order to perform step 134, the operator issues commands with the user interface 133 and/or the host computer 105 (of FIG. 2) to invoke the process control program 123 (of FIG. 2). Then, the operator enters the input parameters $\Delta t_r$, S, k, $C_p$, $\rho$, $L_v$, $\mu$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, z, $T_{REF}$, $F_{targ}$, $T_{sI}$, $T_{se1}{}^0$, $T_{se2}{}^0$, $T_{se3}{}^0$, $V_{scir1}{}^0$, $V_{scir2}{}^0$, $V_{scir3}{}^0$, $RH_{s1}{}^0$, $RH_{s2}{}^0$, $RH_{s3}{}^0$, $v_{min}$, $v_{max}$, $L_1$, $L_2$, $L_3$, $W_1$, $W_2$, and $W_3$ with the user interface and/or the hos computer. The process control program loads the entered input parameters into the primary memory 120 for use by the programs 123 to 126. The execution of these programs is controlled and coordinated by the process control program in the manner discussed next.

Figure 4:
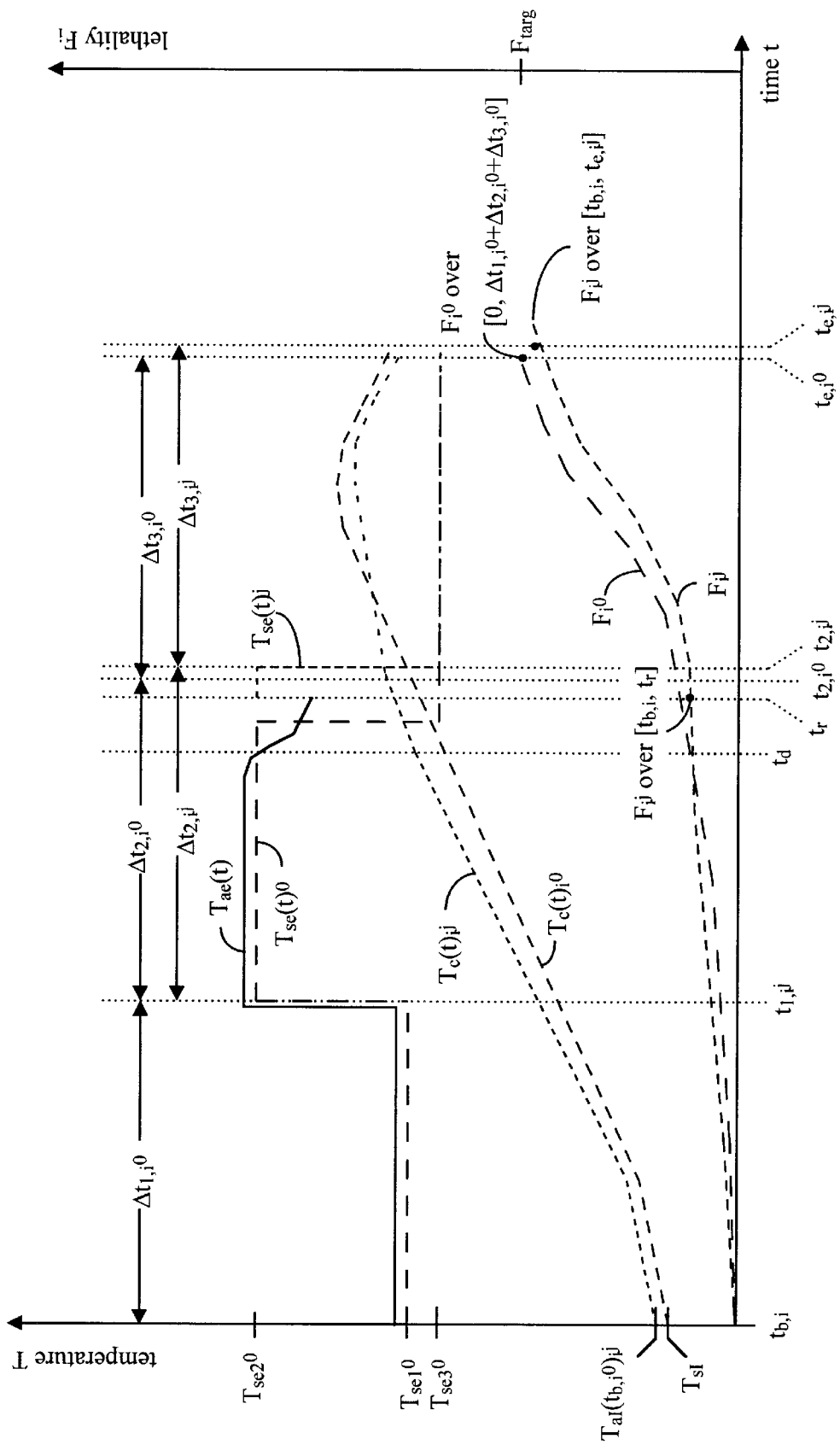
FIG. 4 is a timing diagram for handling a temperature deviation according to the overall process flow diagram of FIG. 3.

The process control program 123 (of FIG. 2) first invokes the process scheduling program 124 (of FIG. 2). In step 135, the process scheduling program simulates the continuous oven cooking process to be administered to each food item i to define an initially scheduled belt speed $V_{sbelt}{}^0$ for the belt 107 (of FIG. 1). Referring also to FIG. 4, this belt speed is defined to provide an initially scheduled accumulated lethality $F_i{}^0$ to be delivered to the core of each food item i over a time interval [0, $\Delta t_{1,i}{}^0 + \Delta t_{2,i}{}^0 + \Delta t_{3,i}{}^0$] that will satisfy the target lethality $F_{targ}$. In this simulation, begin time $t_{b,i}$ is set to 0 and the end time $t_{e,i}$ is equal to an initially scheduled time duration $\Delta t_{1,i}{}^0 + \Delta t_{2,i}{}^0 + \Delta t_{3,i}{}^0$ of each food item i in the oven 102 (of FIG. 1), where $\Delta t_{1,i}{}^0$, $\Delta t_{2,i}{}^0$, $\Delta t_{3,i}{}^0$ are the initially scheduled time durations of each food item i in the corresponding cooking zones 109-1, 2, and 3 (of FIG. 1). The scheduled belt speed is defined based on the input parameters $\Delta t_r$, S, k, $C_p$, $\rho$, $L_v$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, z, $T_{REF}$, $F_{targ}$, $T_{sI}$, $T_{se1}{}^0$, $T_{se2}{}^0$, $T_{se3}{}^0$, $V_{scir1}{}^0$, $V_{scir2}{}^0$, $V_{scir3}{}^0$, $RH_{s1}{}^0$, $RH_{s2}{}^0$, $RH_{s3}{}^0$, $v_{min}$, $v_{max}$, $L_1$, $L_2$, $L_3$, $W_1$, $W_2$, and $W_3$. The iterative process in which step 135 is performed is discussed in greater detail in sub-section 1.c., but will be briefly discussed next.

Still referring to both FIGS. 3 and 4, in the iterative process of step 135, a belt speed $V_{sbelt}{}^0$ is defined that is within the minimum and maximum belt speeds $v_{min}$ and $v_{max}$. Then, the time durations $\Delta t_{1,i}{}^0$, $\Delta t_{2,i}{}^0$, and $\Delta t_{3,i}{}^0$ over which each food item i will be in the corresponding cooking zones 109-1, 2, and 3 (of FIG. 1) is defined. These defined time durations are the same for each food item and are computed from the defined belt speed and the input parameters $L_1$, $L_2$, and $L_3$. From the defined time durations, a core temperature-time profile $T_c(t)_i{}^0$ is simulated that is predicted to occur at the core of each food item i over the time interval [0,$\Delta t_{1,i}{}^0 + \Delta t_{2,i}{}^0 \Delta t_{3,i}{}^0$]. This predicted core temperature-time profile is the same for each food item and is computed based on the defined time durations and the input parameters $\Delta t_r$, S, k, $C_p$, $\rho$, $L_v$, $\mu$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, $T_{sI}$, $T_{se1}{}^0$, $T_{se2}{}^0$, $T_{se3}{}^0$, $V_{scir1}{}^0$, $V_{scir2}{}^0$, $V_{scir3}{}^0$, $RH_{s1}{}^0$, $RH_{s2}{}^0$, $RH_{s3}{}^0$, $L_1$, $L_2$, $L_3$, $W_1$, $W_2$, and $W_3$. An accumulated lethality $F_i{}^0$ that is pred be delivered to the core of each food item i over the time interval the time interval [0, $\Delta t_{1,i}{}^0 + \Delta t_{2,i}{}^0 + \Delta t_{3,i}{}^0$] is then computed. This predicted accumulated lethality is the same for each food item i and is based on the predicted core temperature-time profile, the defined time durations, and the input parameters z, $T_{REF}$. Furthermore, the predicted accumulated lethality is computed according to the earlier discussed lethality equation, where $t_{m,i} = t_{f,i}$, $t_{k,i} = T_c(t)_i = T_c(t)_i{}^0$, and $F_i = F_i{}^0$.

The process just described is iteratively repeated until the predicted accumulated lethality $F_i{}^0$ over [0, $\Delta t_{1,i}{}^0 + \Delta t_{2,i}{}^0 + \Delta t_{3,i}{}^0$] satisfies the target lethality $F_{targ}$. This predicted accumulated lethality is the initially scheduled accumulated lethality to be delivered to the core of each food item i and is the same for each food item. The defined belt speed $v_{sbelt}{}^0$ for which this occurs is therefore the initially scheduled belt speed for the continuous oven cooking process. Similarly, the defined time durations $\Delta t_{1,i}{}^0$, $\Delta t_{2,i}{}^0$, and $\Delta t_{3,i}{}^0$ for which this occurs are the same for each food item i and are the initially scheduled time durations that each food item i will be in the corresponding cooking zones 109-1, 2, and 3 (of FIG. 1). Furthermore, the predicted core temperature-time profile $T_c(t)_i{}^0$ for which this occurs is the initially scheduled core temperature-time profile at the core of each food item i and is the same for each food item.

The process just described also results in the definition of an initially scheduled total environment temperature-time profile $T_{se}(t)_i{}^0$, an initially scheduled total air circulation velocity-time profile $v_{scir}(t)_i{}^0$, and an initially scheduled total relative humidity-time profile $RH_s(t)_i{}^0$ that are the same for each food item i. The total environment temperature-time profile $T_{se}(t)_i{}^0$ includes respective portions performed in the cooking zones 109-1, 2, and 3 (of FIG. 1) at the corresponding scheduled environment temperatures $T_{se1}{}^1$, $T_{se2}{}^0$, and $T_{se3}{}^0$ over the corresponding initially scheduled time durations $\Delta t_1{}^0$, $\Delta t_2{}^0$, and $\Delta t_3{}^0$. Similarly, the total air circulation velocity-time profile $v_{scir}(t)_i{}^0$ includes respective portions performed in the cooking zones 109-1, 2, and 3 at the corresponding scheduled air circulation velocities $v_{scir1}{}^0$, $v_{scir2}{}^0$, and $v_{scir3}{}^0$ over the corresponding initially scheduled time durations $\Delta t_1{}^0$, $\Delta t_2$, and $\Delta t_3{}^0$. And, the total relative humidity-time profile $RH_s(t)_i{}^0$ includes respective portions performed in the cooking zones 109-1, 2, and 3 at the corresponding scheduled relative humidities $RH_{s1}{}^0$, $RH_{s2}{}^0$, and $RH_3{}^0$ over the corresponding initially scheduled time durations $\Delta t_1{}^0$, $\Delta t_2{}^0$, and $\Delta t_3{}^0$.

The process control program 123 (of FIG. 2) controls the administration of the continuous oven cooking process in steps 136 to 149. In doing so, it first sets a counter j to zero in step 136. This counter j is used to count each time that the currently scheduled belt speed $v_{sbelt}{}^j$ is adjusted during the continuous oven cooking process. Here, the counter j is set to zero to indicate that the currently scheduled belt speed $v_{sbelt}^{j}$ has not yet been adjusted and is set to the initially scheduled belt speed $v_{sbelt}^{0}$.

Then, at the current sample real time t the process control program 123 causes the control circuitry 129 (of FIG. 2) in step 137 to administer the continuous oven cooking process at the currently scheduled belt speed $v_{sbelt}^{j}$ and at the scheduled environment temperatures $T_{se1}^{0}$, $Tse2^{0}$, and $T_{se3}^{0}$, scheduled air circulation velocities $V_{scir1}^{0}$, $V_{scir2}^{0}$, and $V_{scir3}^{0}$, and scheduled relative humidities $RH_{s1}^{0}$, $RH_{s2}^{0}$, and $RH_{s3}^{0}$ in the corresponding cooking zones 109-1, 2, and 3 (of FIG. 1). In doing so, the control circuitry appropriately controls the corresponding heat mechanisms 110-1, 2, and 3 (of FIG. 1) and monitors the corresponding actual environment temperatures $T_{ae1}(t_r)$, $T_{ae2}(t_r)$, and $T_{ae3}(t_r)$, actual air circulation velocities $V_{acir1}(t_r)$, $V_{acir2}(t_r)$, and $V_{acir3}(t_r)$, and actual relative humidities $RH_{a1}(t_r)$, $RH_{a2}(t_r)$, and $RH_{a3}(t_r)$ at the time $t_r$ to verify that they are at least equal to the corresponding scheduled environment temperatures $T_{se1}^{0}$, $T_{se2}^{0}$, and $T_{se3}^{0}$, scheduled air circulation velocities $V_{scir1}^{0}$, $V_{scir2}^{0}$, and $V_{scir3}^{0}$, and scheduled relative humidities $RH_{s1}^{0}$, $RH_{s2}^{0}$, and $RH_{s3}^{0}$. In this embodiment of the controller 104 (of FIGS. 1 and 2), the scheduled environment temperatures, scheduled air circulation velocities, and scheduled relative humidities will remain the same throughout the continuous oven cooking process regardless if temperature, air circulation velocity, or relative humidity deviations occur in the cooking zones. Thus, if such a deviation does occur in a particular cooking zone 109-n, where n=1, 2, or 3, then the control circuitry administers corrections at the time $t_r$ so that the deviant actual environment temperature $T_{aen}(t_r)$, actual air circulation velocity $V_{acirn}(t_r)$, or actual relative humidity $RH_{an}(t_r)$ in the cooking zone will eventually be brought up to at least the corresponding scheduled environment temperature $T_{sen}^{0}$, scheduled air circulation velocity $V_{scirn}^{0}$, or scheduled relative humidity $RH_{sn}^{0}$.

Then the process control program 123 (of FIG. 2) waits for the next sample real time $t_r = t_r + \Delta t_r$ in step 138. In step 139, this program records the actual environment temperatures $T_{ae1}(t_r)$, $T_{ae2}(t_r)$, and $T_{ae3}(t_r)$, actual air circulation velocities $V_{acir1}(t_r)$, $V_{acir2}(t_r)$, and $V_{acir3}(t_r)$, and actual relative humidities $RH_{a1}(t_r)$, $RH_{a2}(t_r)$, and $RH_{a3}(t_r)$ in the cooking zones 109-1, 2, and 3 at each sample real time $t_r$. By doing so, the program compiles the corresponding actual environment temperature-time profiles $T_{ae1}(t)$, $T_{ae2}(t)$, and $T_{ae3}(t)$, actual air circulation velocity-time profiles $V_{acir1}(t)$, $V_{acir2}(t)$, and $V_{acir3}(t)$, and actual relative humidity-time profiles $RH_{a1}(t)$, $RH_{a2}(t)$, and $RH_{a3}(t)$ Similarly, the program records the periodically sensed actual initial core temperature $T_{a1}(t_r)$ to compile the actual initial core temperature-time profile $T_{aI}(t)$. The program also records the currently scheduled belt speed $v_{sbelt}^{j}$ at each time $t_r$ to compile the scheduled belt speed-time profile $v_{sbelt}(t)$.

Then, in step 140, the process control program 123 (of FIG. 2) determines whether any temperature, air circulation velocity, or relative humidity deviations are occurring at the time $t_r$ in any of the cooking zones 109-1, 2, and 3 (of FIG. 1). In doing so, the program monitors the corresponding actual environment temperature $T_{aen}(t_r)$, actual air circulation velocity $V_{acirn}(t_r)$, and actual relative humidity $RH_{an}(t_r)$ in each cooking zone 109-n to determine if any of them are less than the corresponding scheduled environment temperature $T_{sRTn}^{0}$, scheduled air circulation velocity $V_{scirn}^{0}$, and scheduled relative humidity $RH_{sn}^{0}$.

If no temperature, air circulation velocity, and/or relative humidity deviation is occurring, then the process control program 123 (of FIG. 2) proceeds to step 141. Any under cooked food items $\{ \ldots, i, \ldots \}_{under}$ that are identified in step 148 for segregation and are being discharged by the discharge device 112 (of FIG. 1) at the current sample real time $t_r$ are then segregated in step 141 by the discharge device. The process control program causes the control circuitry 129 (of FIG. 2) to control the discharge device in performing this segregation. In step 149, the process control program sets the currently scheduled belt speed $v_{sbelt}^{j}$ to the scheduled belt speed $v_{sbelt}^{0}$ if all of the food item $\{ \ldots, i, \ldots \}_{aff}$ affected by a temperature deviation have been discharged. Steps 141, 148, and 149 are discussed in more detail later. The process control program then administers the continuous oven cooking process in step 137 and waits for the next sample real time $t_r = t_r + \Delta t_r$ in step 138 to repeat the steps 139 to 149.

However, if the process control program 123 (of FIG. 2) does determine in step 140 that a temperature, air circulation velocity, and/or relative humidity deviation is occurring in a cooking zone 109-n (of FIG. 1) at the current sample real time $t_r$, then the process control program invokes the deviation program 125 (of FIG. 2). FIG. 4 shows an example of a temperature deviation occurring in the cooking zone 109-2 (of FIG. 1).

In step 142, the program 125 (of FIG. 2) identifies the food item i that currently at the current sample real time $t_r$ has the minimum accumulated lethality $F_i^j$ predicted to be delivered to its core over its currently scheduled time interval $[t_{b,i}, t_{e,i}^j]$ in the oven 102 (of FIG. 1), where $t_{b,i}$ is the actual begin time when the food item entered the oven and $t_{e,i}^j$ is the currently scheduled end time when the food item is scheduled to exit the oven. This minimum lethality food item i is identified from among the food items $\{ \ldots, i, \ldots \}_{aff}$ that are currently affected by the deviation. These affected containers are those of the food items $\{1, \ldots, i, \ldots, I\}_{line}$ that are at the time $t_r$ currently in the cooking zone 109-n (of FIG. 2) in which the deviation is occurring. This is determined using the scheduled belt speed-time profile $v_{belt}(t)$ compiled in step 139 and the length information $L_1$, $L_2$, and $L_3$ for the cooking zones 109-1, 2, and 3 (of FIG. 1).

In one approach for identifying the minimum lethality food item i from among the affected food items $\{ \ldots, i, \ldots \}_{aff}$, the temperature deviation program 125 (of FIG. 2) may use an optimization search technique, such as the Brendt method disclosed in Press, W. H., Teukolsky, S. A., Vettering, W. T., and Flannery, B. P., *Numerical Recipes in Fortran; The Art of Scientific Computing,* Cambridge University Press, 1992. In this case, the program computes currently predicted accumulated lethalities $\{ \ldots F_i^j \text{ over } [t_{b,i}, t_{e,i}^j], \ldots \}_{sel}$ for selected food items $\{ \ldots, i, \ldots \}_{sel}$ to be evaluated. Based on these lethalities, the program iteratively bisects the list of affected food items to select the selected food items from among the affected food items until the minimum lethality food item i is identified.

In a variation of the approach just described, the deviation program 125 (of FIG. 2) may initially use predefined intervals to select food items $\{ \ldots, i, \ldots \}_{int}$ at the intervals as the selected food items $\{ \ldots, i, \ldots \}_{sel}$ for evaluation. Then, around those of the selected food items that have predicted accumulated lethalities $\{ \ldots, F_i^j \text{ over } [t_{b,i}, t_{e,i}^j], \ldots \}_{sel}$ that are currently the lowest at their corresponding intervals, the optimization search technique just described is used.

In still another approach for identifying the minimum lethality food item i, the deviation program 125 (of FIG. 2) may select all of the affected food items $\{ \ldots, i, \ldots \}_{aff}$ as the selected food items $\{ \ldots, i, \ldots \}_{sel}$ for evaluation. In doing so, the program computes at each sample real time $t_r$, the currently predicted accumulated lethality $F_i^j$ over $[t_{b,i}, t_{e,i}^j]$ for each food item i. From these lethalities $\{ \ldots, F_i^j$ over $[t_{b,i}, t_{e,i}^j], \ldots \}_{se1}$ for the selected food items, the minimum lethality food item i is identified.

In each of the approaches just described, the currently predicted accumulated lethality $F_i^j$ over $[t_{b,i}, t_{e,i}^j]$ for each selected food item i is computed in the same way by the deviation program 125 (of FIG. 2). This is done so that the currently predicted accumulated lethality $F_i^j$ over $[t_{b,i}, t_{e,i}^j]$ is the sum of an estimated currently accumulated lethality $F_i^j$ over $[t_{b,i}, t_r]$ and a predicted remaining accumulated lethality $F_i^j$ over $[t_r, t_{e,i}^j]$. The estimated currently accumulated lethality is the lethality estimated to have been delivered to the food item's core over the actual time interval $[t_{b,i}, t_r]$ that the food item has been in the oven 102 (of FIG. 1). The predicted remaining accumulated lethality is the lethality predicted to be delivered to the food item's core over the currently scheduled remaining time interval $[t_r, t_{e,i}^j]$ that the food item is to be in the oven 102. The precise manner in which the estimated currently accumulated lethality and the currently predicted accumulated lethality are computed in step 142 is discussed in greater detail in sub-sections 1.d. and 1.e., respectively, but will be discussed briefly next.

In computing the currently predicted accumulated lethality $F_i^j$ over $[t_{b,i}, t_{e,i}^j]$, the portion of the continuous oven cooking process that was actually administered over the time interval $[t_{b,i}, t_r]$ is first simulated. Specifically, the portion of the currently predicted core temperature-time profile $T_{cl\,(t)i}^j$ over the actual time interval $[t_{b,i}, t_r]$ is simulated for the food item i. This is done based on the input parameters $\Delta t_r$, S, k, $C_p$, $\rho$, $L_v$, $\mu$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, $L_1$, $L_2$, $L_3$, $W_1$, $W_2$, and $W_3$, the actual initial core temperature $T_{ai}(t_{b,i})$ for the food item i, and the portions of the actual environment temperatuee-time profiles $T_{ae1}(t), \ldots, T_{aen}(t)$, actual air circulation velocity-time profiles $V_{acri1}(t), \ldots, V_{acirn}(t)$, and the actual relative humidity-time profiles $RH_{acir}(t), \ldots, RH_{acir}(t)$ over the corresponding actual time intervals $[t_{b,i}, t_{1,i}^j], \ldots, (t_{n-1,i}^j, t_r]$ that the food item was in the cooking zones 109-1, ..., n (of FIG. 1). Here, n=1, 2, or 3 and identifies the cooking zone 109-n in which the temperature deviation is occurring. For the example of FIG. 4, n=2 since the deviation is occurring in the cooking zone 109-2.

The actual initial core temperature $T_{ai}(t_{b,i})$ for the food item i is obtained from the actual initial core temperature-time profile $T_{ai}(t)$ compiled in step 139. The actual time intervals $[t_{b,i}, t_{1,i}^j], \ldots, (t_{n-1,i}^j, t_r]$ for the selected food item i are determined by the deviation program 125 (of FIG. 2) from the scheduled belt speed-time profile $v_{sbelt}(t)$ and the length information $L_1, \ldots, L_n$, for the cooking zones 109-1, ..., n (of FIG. 1).

In the example of FIG. 4, since the deviation occurs in the cooking zone 109-2 (of FIG. 1), the portion of the currently predicted core temperature profile $T_c(t)_i^j$ that occurred over the actual time interval $[t_{b,i}, t_r]$ is based in this case on the portions of the actual environment temperature-time profiles $T_{ae1}(t)$ and $T_{ae2}(t)$ respectively over the actual time intervals $[t_{b,i}, t_{1,i}^0]$ and $(t_{1,i}, t_r]$. The time interval $[t_{b,i}, t_{1,i}^0]$ has the initially scheduled time duration $\Delta t_1^0$ since the temperature deviation began at the deviation begin time $t_d$ while the food item i was in the cooking zone 109-2. If, however, this food item was in the cooking zone 109-1 when the deviation began, then the actual time interval $[t_{b,i}, t_{1,i}^1]$ will be different and will have a currently scheduled time duration $\Delta t_1^1$ that is different than and re-scheduled from the intitially scheduled time duration $\Delta t_1^0$. This would be due to the currently scheduled belt speed $v_{sbelt}^1$ being changed and re-scheduled from the initially scheduled belt speed $v_{sbelt}^0$ while the food item was still in the cooking zone 109-1.

From the actual portion of the currently predicted core temperature-time profile $T_c(t)_i^j$ over $[t_{b,i}, t_r]$ and the input parameters z and $T_{REF}$, the deviation program 125 (of FIG. 2) computes the estimated accumulated lethality $F_i^j$ that has been delivered to the product cold spot of the selected food item i over the actual time interval $[t_{b,i}, t_r]$. This is done using Eq. (1) described earlier, where $t_m = t_{b,i}$, $t_k = t_r$, $T_c(t) = T_c(t)_i^j$, and $F_i = F_i^j$. As mentioned earlier, the precise manner in which this estimated accumulated lethality is computed in step 142 is discussed in greater detail in sub-section 1.d.

Then, the deviation program 125 (of FIG. 2) simulates the remaining portion of the continuous oven cooking process that is predicted to be administered to the selected food item i over the currently scheduled remaining time interval $(t_r, t_{e,i}^j]$. In performing this simulation, the predicted remaining portion of the currently predicted core temperature-time profile $T_c(t)_i^j$ over the time interval $(t_r, t_{e,i}^j]$ is simulated. This is done assuming that the temperature deviation ends after the current sample real time tr. Moreover, this is done based on the input parameters $\Delta t_r$, S, k, $C_p$, $\rho$, $L_v$, $\mu$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, $L_1$, $L_2$, $L_3$, $W_1$, $W_2$, and $W_3$ the actual core temperature $T_c(t_r)_i^j$ for the selected food item i at the time $t_r$, and the scheduled environment temperatures $T_{sen}^0, \ldots, T_{se3}^0$, the scheduled air circulation velocities $V_{scim}^0, \ldots, V_{scir3}^0$, and the scheduled relative humidities $RH_{sn}^0, \ldots, RH_{s3}^0$ over the corresponding currently scheduled remaining time intervals $(t_r, t_{n,i}^j], \ldots, (t_{2,i}^j, t_{e,i}^j]$.

Here, the actual core temperature $T_c(t_r)_i^j$ for the selected food item i is obtained from the actual portion of the currently predicted core temperature-time profile $T_c(t)_i^j$ over $[t_{b,i}, t_r]$ that was just described. The currently scheduled time intervals $(t_r, t_{n,i}^j], \ldots, (t_{2,i}^j, t_{e,i}^j]$ for the selected food item i are determined by the deviation program 125 (of FIG. 2) from the scheduled belt speed-time profile $v_{sbelt}(t)$, and the cooking zone length information $L_1$, $L_2$, and $L_3$.

As indicated previously, the temperature deviation occurs in the cooking zone 109-2 in the example of FIG. 4. Therefore, the predicted remaining portion of the currently predicted core temperature profile $T_c(t)_i^j$ is based on the scheduled environment temperatures $T_{se2}^0$ and $T_{se3}^0$, the scheduled air circulation velocities $V_{scir2}^0$ and $V_{scir3}^0$, and the scheduled relative humidities $RH_{s2}^0$ and $RH_{s3}^0$ over the corresponding currently scheduled remaining time intervals $(t_r, t_{2,i}^j]$ and $(t_{2,i}^j, t_{e,i}^j]$. In this example, the time intervals $(t_{1,i}^j, t_{2,i}^j]$ and $(t_{2,i}^j, t_{e,i}^j]$ have currently scheduled tim durations $\Delta t_2^j$ and $\Delta t_3^j$, respectively, that are different than and have been re-scheduled from the initially scheduled time durations $\Delta t_2^0$ and $\Delta t_3^0$. This is due to the fact that the currently scheduled belt speed $v_{sbelt}^j$ at the current sample real time $t_r$ is different than and has been rescheduled from the initially scheduled belt speed $v_{sbelt}^0$.

From the predicted remaining portion of the core temperature-time profile $T_c(t)_i^j$ over $(t_r, t_{e,i}^j]$, the estimated currently accumulated lethality $F_i^j$ over $[t_{b,i}, t_r]$ that was just described, and the input parameters z and $T_{REF}$, the deviation program 125 computes the currently predicted accumulated lethality $F_i^j$ over $[t_{b,i}, t_{e,i}^j]$. This is also done using Eq. (1) described earlier, where $t_m = t_r$, $t_k = t_{e,i}^j$, $T_c(t) = T_c(t)_i^j$, and $F_i = F_i^j$. As mentioned previously, the currently predicted accumulated lethality $F_i^j$ over $[t_{b,i}, t_{e,i}^j]$ is the sum of the estimated currently accumulated lethality $F_i^j$ over $[t_{b,i}, t_r]$ and the predicted remaining lethality $F_i^j$ over $[t_r, t_{e,i}^j]$. As mentioned earlier, the precise manner in which the currently predicted accumulated lethality is computed in step 142 is discussed in greater detail in sub-section 1.e.

Then, in step 143, the deviation program 125 (of FIG. 2) determines at the current sample real time $t_r$ if the food item i with the minimum currently predicted accumulated lethality $F_i^j$ over $[t_{b,i}, t_{e,i}^j]$ is less than the target lethality $F_{targ}$. If it is not, then this means that all of the affected food items $\{ \ldots, i, \ldots \}_{aff}$ also have currently predicted accumulated lethalities $\{ \ldots, F_i^j$ over $[t_{b,i}, t_{e,i}^j], \ldots \}_{aff}$ that are at least equal to the target total lethality. In this case, the process control program 123 (of FIG. 2) proceeds to step 141 and causes any of the previously identified under cooked food items $\{ \ldots, i, \ldots \}_{under}$ that are being discharged at the time $t_r$ to be segregated. Then, in the manner discussed earlier, the process control program administers the continuous oven cooking process in step 137 and waits for the next sample real time $t_r = t_r + \Delta t_r$ in step 138 to repeat the steps 139 to 148.

In this embodiment, if it is determined in step 143 that the minimum currently predicted accumulated lethality $F_i^j$ over $[t_{b,i}, t_{e,i}^j]$ is less than the target lethality $F_{targ}$, then the deviation program 125 (of FIG. 2) determines in step 144 if the currently scheduled belt speed $v_{sbelt}^j$ is set to the minimum belt speed $v_{min}$. If it is not, then the program increments the counter j in step 145 and re-schedules the currently scheduled belt speed by re-defining it in step 146.

In step 146, the currently scheduled belt speed $v_{sbelt}^j$ is re-defined in a similar manner to the way in which the initially scheduled belt speed $v_{sbelt}^0$ is defined in step 135. But, in this case the actual core temperature $T_c(t_r)_i^j$ at the time t and the estimated currently accumulated lethality $F_i^j$ over $[t_{b,i}, t_r]$ for the minimum lethality food item i are used in simulating the remaining portion of the continuous oven cooking process in order to compute a currently predicted accumulated lethality $F_1^j$ over $[t_{b,i}, t_{e,i}^j]$. This is done in a similar manner to that described earlier for computing the currently predicted accumulated lethality for a food item in step 142. But, similar to step 135, this is done iteratively until a belt speed $v_{sbelt}^j$ is determined for which a currently predicted accumulated lethality $F_i^j$ over $[t_{b,i}, t_{e,i}^j]$ satisfies the target lethality $F_{targ}$ or the belt speed $V_{sbelt}^j$ equals the minimum belt speed $v_{min}$. The precise manner in which step 146 is performed is discussed in greater detail in sub-section 1.f., but will be briefly discussed next.

The re-definition of the currently scheduled belt speed $V_{sbelt}^j$ results in the re-definition of a currently scheduled remaining environment temperature-time profile $T_{se}(t)_i^j$, a currently scheduled remaining air circulation velocity-time profile $v_{scir}(t)_i^j$, and a currently scheduled remaining relative humidity-time profile $RH_s(t)_i^j$ for the minimum lethality food item i. The remaining environment temperature-time profile $T_{se}(t)^j$, the remaining air circulation velocity-time profile $v_{scir}(t)^j$, and the remaining relative humidity-time profile $Rh_s(t)_i^j$ include respective remaining portions in the cooking zone 109-n (of FIG. 1) in which the deviation occurred. These remaining portions occur over a corresponding currently scheduled time duration $\Delta t_2^j$ that is different from and re-scheduled from the previously scheduled time duration $\Delta t_2^{j-1}$. The remaining environment temperature-time profile $T_{se}(t)^j$, the remaining air circulation velocity-time profile $v_{scir}(t)_j^1$, and the remaining relative humidity-time profile $RH_s(t)^j$ also include respective complete portions in the cooking zones 109-n+1, . . . , 3 (of FIG. 1) over corresponding currently scheduled time durations $\Delta t_{n+1}^j, \ldots, \Delta t_3^j$ that are different from and re-scheduled from the previously scheduled time durations $\Delta t_{n+1}^{j-1}, \ldots, \Delta t_3^{j-1}$.

In the example of FIG. 4, the remaining environment temperature-time profile $T_{se}(t)_i^1$, the remaining air circulation velocity-time profile $v_{scir}(t)_i^1$, and the remaining relative humidity-time profile $RH_s(t)_i^1$ include respective remaining portions in the cooking zone 109-2 (of FIG. 1) over a corresponding currently scheduled time duration $\Delta t_2^1$ that is different from and re-scheduled from the initially scheduled time duration $\Delta t_2^0$. The remaining environment temperature-time profile $T_{se}(t)_i^1$, the remaining air circulation velocity-time profile $v_{scir}(t)_i^1$, and the remaining relative humidity-time profile $RH_s(t)_i^1$ also include respective complete portions in the cooking zone 109-3 (of FIG. 1) over a corresponding currently scheduled time duration $\Delta t_3^1$ that is different from and re-scheduled from the initially scheduled time duration $\Delta t_3^0$.

Ideally, it is desired that the currently predicted accumulated lethality $F_i^j$ over $[t_{b,i}, t_{e,i}^j]$ for the minimum lethality food item i will satisfy the target lethality $F_{targ}$. But, as just mentioned, the currently scheduled belt speed $v_{sbelt}^j$ may be limited to the minimum belt speed $v_{min}$. In this case, the currently predicted accumulated lethality will not satisfy the target total lethality $F_{targ}$. If the deviation program 125 (of FIG. 2) determines this to be the case in step 147, then this means that under cooked food items $\{ \ldots, i, \ldots \}_{under}$ from among the affected food items $\{ \ldots, i, \ldots \}_{aff}$ will have currently predicted accumulated lethalities $\{ \ldots, F_i^j$ over $[t_{b,i}, t_{e,i}], \ldots \}_{under}$ that are less than the target lethality. The minimum lethality food item i is of course one of the under cooked food items. The under cooked food items are to be segregated and are identified at the current real sample time $t_r$ in step 148 by the program.

Figure 5:
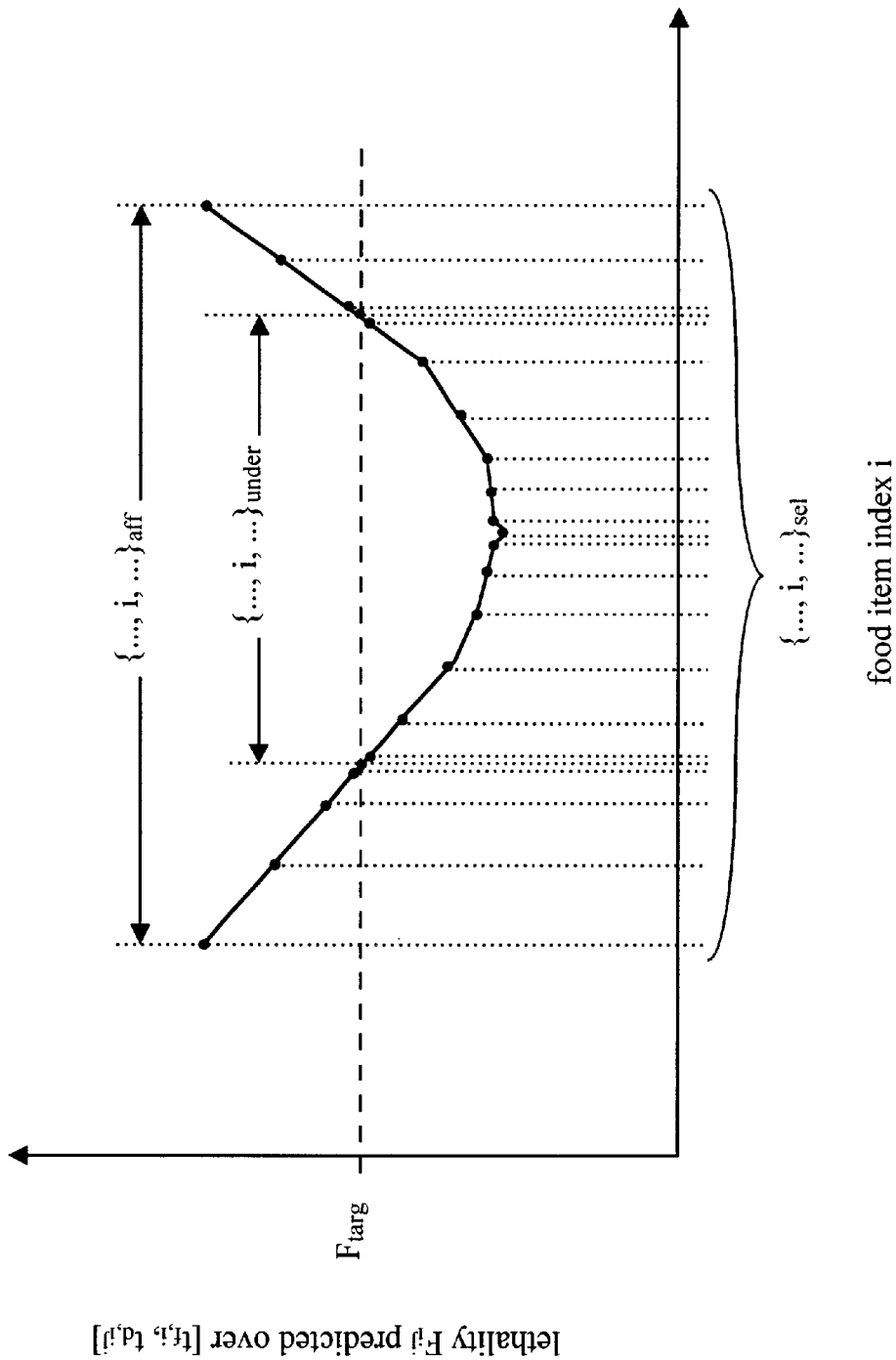
FIG. 5 is a lethality distribution diagram showing the distribution of lethalities for food items affected by the deviation shown in FIG. 4.

FIG. 5 shows the distribution of the affected food items $\{ \ldots, i, \ldots \}_{aff}$ and the under cooked food items $\{ \ldots, i, \ldots \}_{under}$ to be segregated at the time $t_r$. In identifying the under cooked food items in step 148, the deviation program 125 (of FIG. 2) uses a similar approach as that used in step 142 to identify the minimum lethality food item i. But, in this case, the additional criteria of the target lethality $F_{targ}$ is used to expand the search.

Once the under cooked food items $\{ \ldots, i, \ldots \}_{under}$ have been identified at the current real sample time $t_r$, the process control program 123 (of FIG. 2) then proceeds to step 141. As discussed earlier, the process control program causes the control circuitry 129 (of FIG. 2) to control the discharge device 111 (of FIG. 1) in segregating any of the under cooked food items that are being discharged at the current sample real time $t_r$. In order to segregate the under cooked food items, the process control program tracks these food items to determine when they will be discharged. This is done using the scheduled belt speed-time profile $v_{sbelt}(t)$ and the cooking zone length information $L_1$, $L_2$, and $L_3$.

The steps 137 to 149 are repeated until the temperature deviation is cleared. In this way, at each sample real time $t_r$ during the deviation, the list of under cooked food items $\{ \ldots, i, \ldots \}_{under}$ at the time $t_r$ is combined with the list from the previous sample real time $t_r$. As a result, the list of under cooked food items is dynamically updated and maintained. Since these under cooked food items are segregated when discharged in step 141, this will ensure that only those of the food items $\{1, \ldots, i, \ldots \}_{aff}$ that are adequately cooked are released for distribution.

The list of affected food items $\{ \ldots, i, \ldots \}_{aff}$ is also dynamically updated and maintained in the same manner as the list of under cooked food items $\{ \ldots, i, \ldots \}_{under}$. When the temperature deviation is cleared, this list will remain the same and the process control program 123 tracks the food items in this list until they have all been discharged. This tracking is done in the same manner in which the under cooked food items are tracked. The process control program 123 will then set the currently scheduled belt speed $v_{sbelt}^{j}$ back to the initially scheduled belt speed $v_{sbelt}^{0}$ in step 149.

Furthermore, the controller 104 has the unique feature of being able to handle multiple temperature, air circulation velocity, and/or rlative humidity deviations. For example, if another deviation does occur, then the steps 137 to 149 are repeated during this deviation. Therefore, A even if a selected food item i is exposed to multiple deviations, the predicted total lethality $F_i^j$ over $[t_{b,i}, t_{e,i}^j]$ that will be delivered to it can be accurately determined based on those of the actual environment temperature-time profiles $T_{ae1}(t)$, $T_{ae2}(t)$, and $T_{ae3}(t)$, actual air circulation velocity-time profiles $V_{acir1}(t)$, $V_{acir2}(t)$, and $V_{acir3}(t)$, and actual relative humidity-time profiles $RH_{a1}(t)$, $RH_{a2}(t)$, and $RH_{a3}(t)$ that it has been treated with over the continuous oven cooking process. Moreover, this results in the list of under cooked food items $\{\ldots, i, \ldots\}_{under}$ being further updated and expanded.

1.c. Detailed Process Flow for Step 135 of FIG. 3

Figure 6:
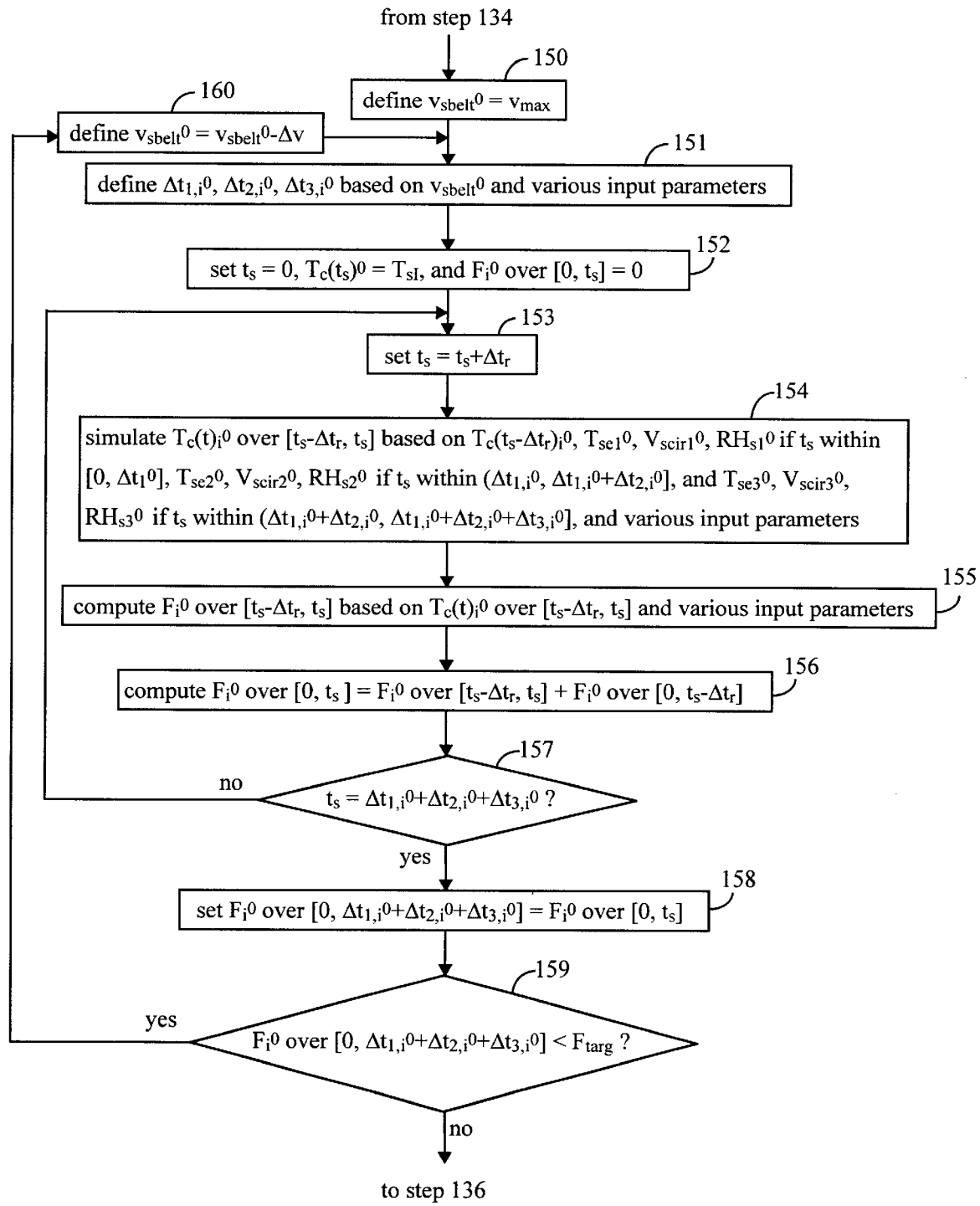
FIGS. 6 to 9 are detailed process flow diagrams for various steps of the overall process flow diagram of FIG. 3.

FIG. 6 shows the detailed process flow that the process scheduling program 124 (of FIG. 2) uses in step 135 of FIG. 3 to define the initially scheduled belt speed $v_{sbelt}^{0}$. In doing so, this program uses sub-steps 150 to 160 of step 135 to iteratively perform a simulation of the continuous oven cooking process that is predicted to be administered to each food item i.

In step 150, the process scheduling program 124 (of FIG. 2) first defines the belt speed $v_{sbelt}^{0}$ as the maximum belt speed $v_{max}$. Then, in step 151, the program defines the time durations $\Delta t_1^{0}$, $\Delta t_2^{0}$, and $\Delta t_3^{0}$ for how long each food item i is scheduled to be in the respective cooking zones 109-1, 2, and 3. This is done based on the belt speed and the length information $L_1$, $L_2$, and $L_3$ for the cooking zones.

In step 152, the current sample simulation time $t_s$ is initially set to zero by the process scheduling program 124. This is the begin time of the simulated continuous oven cooking process for the food item i. The program also initially sets the predicted core temperature $T_c(t_s)_i^{0}$ of the food item's core at this time to the scheduled initial core temperature $T_{sI}$. Similarly, the predicted accumulated lethality $F_i^{0}$ to be delivered to the product cold spot over the current simulation time interval $[0, t_s]$ is initially set by the program to zero.

Steps 153 to 157 are then performed by the process scheduling program 124 (of FIG. 2) in each iteration of the simulation. In step 153 of each iteration, the program increments the current sample simulation time $t_s$ by the amount of the sampling period $\Delta t_r$. This results in a new current sample simulation time $t_s$.

Then, in step 154 of each iteration, the process scheduling program 124 (of FIG. 2) simulates the incremental portion of the core temperature-time profile $T_c(t)_i^{0}$ predicted to occur at the core of the food item i over the current simulation time increment $[t_s-\Delta t_r, t_s]$. This is done based on the predicted core temperature $T_c(t_s-\Delta t_r)_i^{0}$ for the core at the previous sample simulation time $t_s-\Delta t_r$, the earlier discussed input parameters $\Delta t$, $S$, $k$, $C_p$, $\rho$, $L_v$, $\mu$, $A$, $B$, $\alpha$, $\beta$, $r$, $C_0$, $D_1$, $D_2$, $D_3$, $E_1$, $E_2$, $E_3$, $F_1$, $F_2$, $F_3$, $G_0$, $H_0$, $M_0$, $N_0$, $L_1$, $L_2$, $L_3$, $W_1$, $W_2$, and $W_3$, an the scheduled environment temperatures $T_{se1}^{0}$, $T_{se2}^{0}$, $T_{se3}^{0}$, the scheduled air circulation velocities $V_{scir1}^{0}$, $V_{scir2}^{0}$, and $V_{scir3}^{0}$, and the scheduled relative humidities $RH_{s1}^{0}$, $RH_{s2}^{0}$, and $RH_{s3}^{0}$. The simulation in step 154 is performed using a simulation model and is discussed in more detail in sub-section 1.g.

In the first iteration, the predicted core temperature $T_c(t_s-\Delta t_r)_i^{0}$ at the previous sample simulation time $t_s-\Delta t_r$ will be the scheduled initial product temperature $T_{sI}$ from step 152. However, in each subsequent iteration, this temperature is obtained from the portion of the core temperature profile $T_c(t)_i^{0}$ predicted over the previous simulation time increment $[t_s-2\Delta t_r, t_s-\Delta t_r]$ that was simulated in step 154 of the previous iteration.

Moreover, the scheduled environment temperature $T_{se1}^{0}$, the scheduled air circulation velocities $V_{scir1}^{0}$, and the scheduled relative humidity $RH_{s1}^{0}$ are used when the current sample simulation time $t_s$ is within the corresponding simulation time interval $[0, \Delta t_{1,i}^{0}]$. Similarly, the scheduled environment temperature $T_{se2}^{0}$, the scheduled air circulation velocities $V_{scir2}^{0}$, and the scheduled relative humidity $RH_{s2}^{0}$ are used when the current sample simulation time $t_s$ is within the corresponding simulation time interval $(\Delta t_{1,i}^{0}, \Delta t_{1,i}^{0}+\Delta t_{2,i}^{0}]$. Finally, the scheduled environment temperature $T_{se3}^{0}$, the scheduled air circulation velocities $V_{scir3}^{0}$, and the scheduled relative humidity $RH_{s3}^{0}$ are used when the current sample simulation time $t_s$ is within the corresponding simulation time interval $(\Delta t_{1,i}^{0}+\Delta t_{2,i}^{0}, \Delta t_{1,i}^{0}+\Delta t_{2,i}^{0}+\Delta t_{3,i}^{0}]$. The time intervals $[0, \Delta t_{1,i}^{0}]$, $(\Delta t_{1,i}^{0}, \Delta t_{1,i}^{0}+\Delta t_{2,i}^{0}]$, and $(\Delta t_1^{0}+\Delta t_2^{0}, \Delta t_{1,i}^{0}+\Delta t_{2,i}^{0}+\Delta t_{3,i}^{0}]$ indicate how long the food item i is scheduled to be in the respective cooking zones 109-1, 2, and 3.

The lethality $F_i^{0}$ that is predicted to be delivered to the core of the food item i over the current simulation time increment $[t_s-\Delta t_r, t_s]$ is then computed by the process scheduling program 124 (of FIG. 2) in step 155 of each iteration. This is done based on the portion of the core temperature-time profile $T_c(t)_i^{0}$ predicted over this time increment and the input parameters z and $T_{REF}$. This is also done in accordance with Eq. (1) described earlier, where $t_m=t_s-\Delta t_r$, $t_k=t_s$, $T_c(t)=T_c(t)_i^{0}$, and $F_i=F_i^{0}$.

In step 156 of each iteration, the process scheduling program 124 (of FIG. 2) computes the predicted accumulated $F_i^{0}$ to be delivered to the product cold spot of the food item i over the current simulation time interval $[0, t_s]$. This is done by adding the predicted accumulated lethality $F_i^{0}$ over the current simulation time increment $[t_s-\Delta t_r, t_s]$ in step 154 to the predicted accumulated lethality $F_i^{0}$ to be delivered to the product cold spot over the previous simulation time interval $[0, t_s-\Delta t_r]$. In the first iteration, the predicted accumulated lethality over the previous simulation time interval is zero from step 152. In each subsequent iteration, this lethality is computed in step 156 of the previous iteration.

Then, in step 157 of each iteration, the process scheduling program 124 (of FIG. 2) determines whether the current simulation time t, has reached the end time $\Delta t_{1,i}^{0}+\Delta t_{2,i}^{0}+\Delta t_{3,i}^{0}$ of the simulated continuous oven cooking process for the food item i. If it is not, then the program returns to step 153 for the next iteration. In this way, steps 153 to 157 are repeated in each subsequent iteration until it is determined that the end time for the process has been reached. When this finally occurs, the program sets in step 158 the predicted accumulated lethality $F_1^j$ over the current simulation time interval $[0, t_s]$ to the predicted accumulated lethality $F_i^j$ to be delivered to the food item's product cold spot over the total simulation time interval $[0, \Delta t_{1,i}^{0}+\Delta t_{2,i}^{0}+\Delta t_{3,i}^{0}]$.

When this finally occurs, the process scheduling program 124 (of FIG. 2) determines in step 158 whether the predicted accumulated lethality $F_i^{0}$ over $[0, \Delta t_{1,i}^{0}+\Delta t_{2,i}^{0}+\Delta t_{3,i}^{0}]$ is at least equal to the target lethality $F_{targ}$. If it is not, then the program decrements in step 160 the belt speed $v_{sbelt}^0$ by a predefined belt speed offset $\Delta v$. This results in the re-definition of this belt speed. Steps 151 to 160 are then repeated until step 159 is satisfied.

The belt speed $v_{sbelt}^0$ for which step 159 is finally satisfied is then the initially scheduled belt speed used in steps 136 to 148 of FIG. 3 in the manner discussed earlier. As alluded to in sub-section 1.b., the time durations $\Delta t_{1,i}^0$, $\Delta t_{2,i}^0$, and $\Delta t_{3,i}^0$ for which step 159 is satisfied are the initially scheduled time durations that each food item i will be in the corresponding cooking zones 109-1, 2, and 3 (of FIG. 1). Thus, the predicted accumulated lethality $F_i^0$ over $[0, \Delta t_{1,i}^0 + \Delta t_{2,i}^0 + \Delta t_{3,i}^0]$ and the predicted core temperature-time profile $T_c(t)_i^0$ for which step 159 is satisfied are respectively the initially scheduled accumulated lethality to be delivered to the core of each food item i and the initially scheduled core temperature-time profile at the core of each food item i. Furthermore, this also results in the definition of the initially scheduled total environment temperature-time profile $T_{se}(t)_i^0$, the initially scheduled total air circulation velocity-time profile $v_{scir}(t)_i^0$, and the initially scheduled total relative humidity-time profile $RH_s(t)_i^0$ that are the same for each food item i.

1.d. Detailed Process Flow for Computing Estimated Accumulated Lethality $F_i^j$ over $[t_{b,i}, t_r]$ in Steps 142 and 148 of FIG. 3

Figure 7:
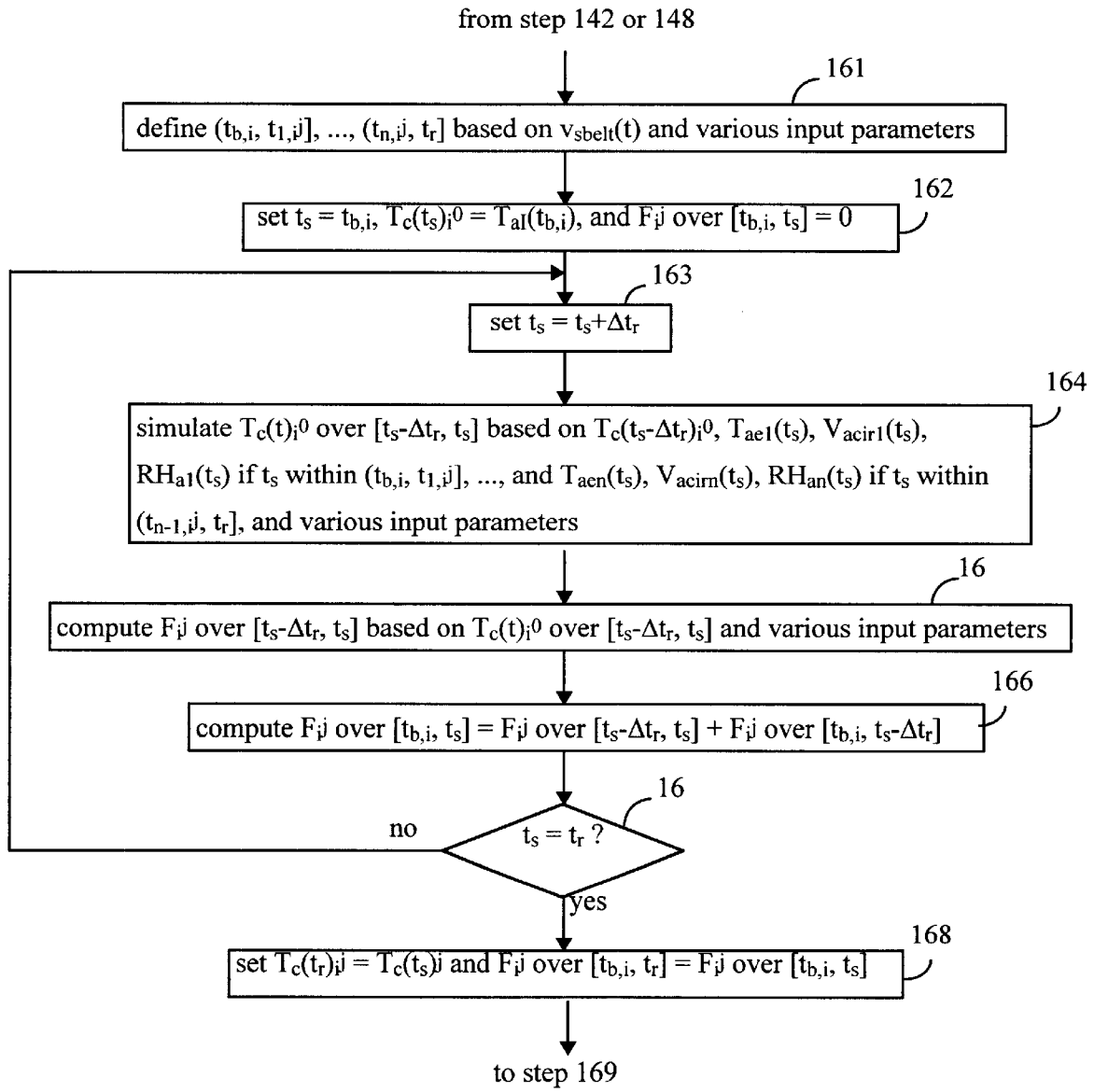

FIG. 7 shows the detailed process flow that the deviation program 125 (of FIG. 2) uses in steps 142 and 148 of FIG. 3 to compute the estimated currently accumulated lethality $F_i^j$ delivered to the core of the food item i over the actual time interval $[t_{b,i}, t_r]$ that the food item has been in the oven 102. This is done by iteratively performing sub-steps 161 to 168 of steps 142 and 148 to simulate the actual portion of the continuous oven cooking process that has been administered to the food item's core over this time interval. Here, steps 161 to 168 are respectively similar to steps 151 to 158 of FIG. 6 and discussed in sub-section 1.c., except for the differences discussed next.

In step 161, the deviation program 125 (of FIG. 2) defines the actual time intervals $[t_{b,i}, t_{1,i}^j], \ldots, (t_{n-1,i}^j, t_r]$ that the food item i has been in the respective cooking zones 109-1, ..., n up to the current sample real time $t_r$. In this step, the definition of these time intervals is based on the scheduled belt speed-time profile $v_{sbelt}(t)$.

In step 162, the deviation program 125 (of FIG. 2) initially sets the core temperature $T_c(t_s)_i^j$ for the core of the food item i at the initial sample simulation time $t_s$ to the actual initial core temperature $T_{ai}(t_{b,i})$ for the food item. This temperature is obtained from the actual initial core temperature-time profile $T_{ai}(t)$. Moreover, the program initially sets the estimated accumulated lethality $F_i^j$ delivered to the core over the current simulation time interval $[t_{b,i}, t_s]$ to zero. In step 163 of each iteration, the program increments the current sample simulation time $t_s$ by the amount of the sampling period $\Delta t_r$ to provide a new current sample simulation time $t_s$.

In step 164 of each iteration, the process scheduling program 124 (of FIG. 2) simulates the incremental portion of the core temperature-time profile $T_c(t)_i^j$ that actually occurred at the core of the food item i over the current simulation time increment $[t_s - \Delta t_r, t_s]$. This is done based on the estimated core temperature $T_c(t_s - \Delta t_r)_i^0$ for the core at the previous sample simulation time $t_s - \Delta t_r$, the earlier discussed input parameters $\Delta t$, S, k, $C_p$, $\rho$, $L_v$, $\mu$, L, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, $L_1$, $L_2$, $L_3$, $W_1$, $W_2$, and $W_3$, and the actual environment temperature-time profiles $T_{ae1}(t)$, $T_{ae2}(t)$, and $T_{ae3}(t)$, the actual air circulation velocity-time profiles $V_{acir1}(t)$, $V_{acir2}(t)$, and $V_{acir3}(t)$, and the actual relative humidity-time profiles $RH_{a1}(t)$, $RH_{a2}(t)$, and $RH_{a3}(t)$ of the cooking zones 109-1, 2, and 3. The simulation in step 164 is performed using the same simulation model mentioned for step 154 of FIG. 6 and is discussed in more detail in sub-section 1.g.

As alluded to earlier, in the first iteration, the estimated core temperature $T_c(t_s - \Delta t_r)_i^0$ at the previous sample simulation time $t_s - \Delta t_r$ will be the actual initial core temperature $T_{ai}(t_{b,i})$ for the food item from step 162. However, in each subsequent iteration, this temperature is obtained from the portion of the core temperature profile $T_c(t)_i^0$ estimated over the previous simulation time increment $[t_s - 2\Delta t_r, t_s - \Delta t_r]$ that was simulated in step 164 of the previous iteration.

Moreover, the simulation is based on the respective actual environment temperatures $T_{ae1}(t_s), \ldots, T_{aen}(t_s)$, actual air circulation velocities $V_{aair1}(t_s), \ldots, V_{aairn}(t_s)$, and actual relative humidities $RH_{a1}(t_s), \ldots, R_{an}(t_s)$ when the current simulation time $t_s$ is within the corresponding simulation time intervals $[t_{b,i}, t_{1,i}^j], \ldots, (t_{n-1,i}^j, t_r]$. These actual environment temperatures, actual air circulation velocities, and relative humidities are obtained from the corresponding actual environment temperature-time profiles $T_{ac1}(t), \ldots, T_{aen}(t)$, the actual air circulation velocity-time profiles $V_{acir1}(t), \ldots, V_{acirn}(t)$, and the actual relative humidity-time profiles $RH_{a1}(t), \ldots, RH_{an}(t)$ of the cooking zones 109-1, ..., n.

The estimated accumulated lethality $F_i^j$ that was delivered to the core of the food item i over the current simulation time increment $[t_s - \Delta t_r, t_s]$ is then computed by the deviation program 125 (of FIG. 2) in step 165 of each iteration. This is done based on the actual portion of the core temperature-time profile $T_c(t)_i^j$ that was simulated over this time increment. In this case, $T_c(t) = T_c(t)_i^j$ and $F_i = F_i^j$ in Eq. (1) described earlier.

In step 166 of each iteration, the deviation program 125 (of FIG. 2) computes the actual lethality $F_i^j$ delivered to the core of the food item i over the current simulation time interval $[t_{b,i}, t_s]$. This is done by adding the estimated accumulated lethality $F_i^j$ over the current simulation time increment $[t_s - \Delta t_r, t_s]$ in step 164 to the estimated accumulated lethality $F_i^j$ over the previous simulation time interval $[t_{b,i}, t_s - \Delta t_r]$.

Then, in step 167 of each iteration, the deviation program 125 (of FIG. 2) determines whether the current simulation time $t_s$ has reached the current sample real time $t_s$. If it is not, then the program returns to step 163 for the next iteration. In this way, steps 163 to 167 are repeated in each subsequent iteration until it is determined that the current sample real time has been reached. When this finally occurs, the deviation program sets in step 168 the estimated accumulated lethality $F_i^j$ over the current simulation time interval $[t_{b,i}, t_s]$ to the estimated currently accumulated lethality $F_i^j$ over the actual time interval $[t_{b,i}, t_r]$ and the estimated core temperature $T_c(t_s)_i^j$ for the food item at the current sample simulation time to the estimated actual core temperature $T_c(t_r)_i^j$ at the current sample real time.

1.e. Detailed Process Flow for Computing Predicted Accumulated Lethality $F_i^j$ over $[t_{b,i}, t_{e,i}^j]$ in Steps 142 and 148 of FIG. 3

Figure 8:
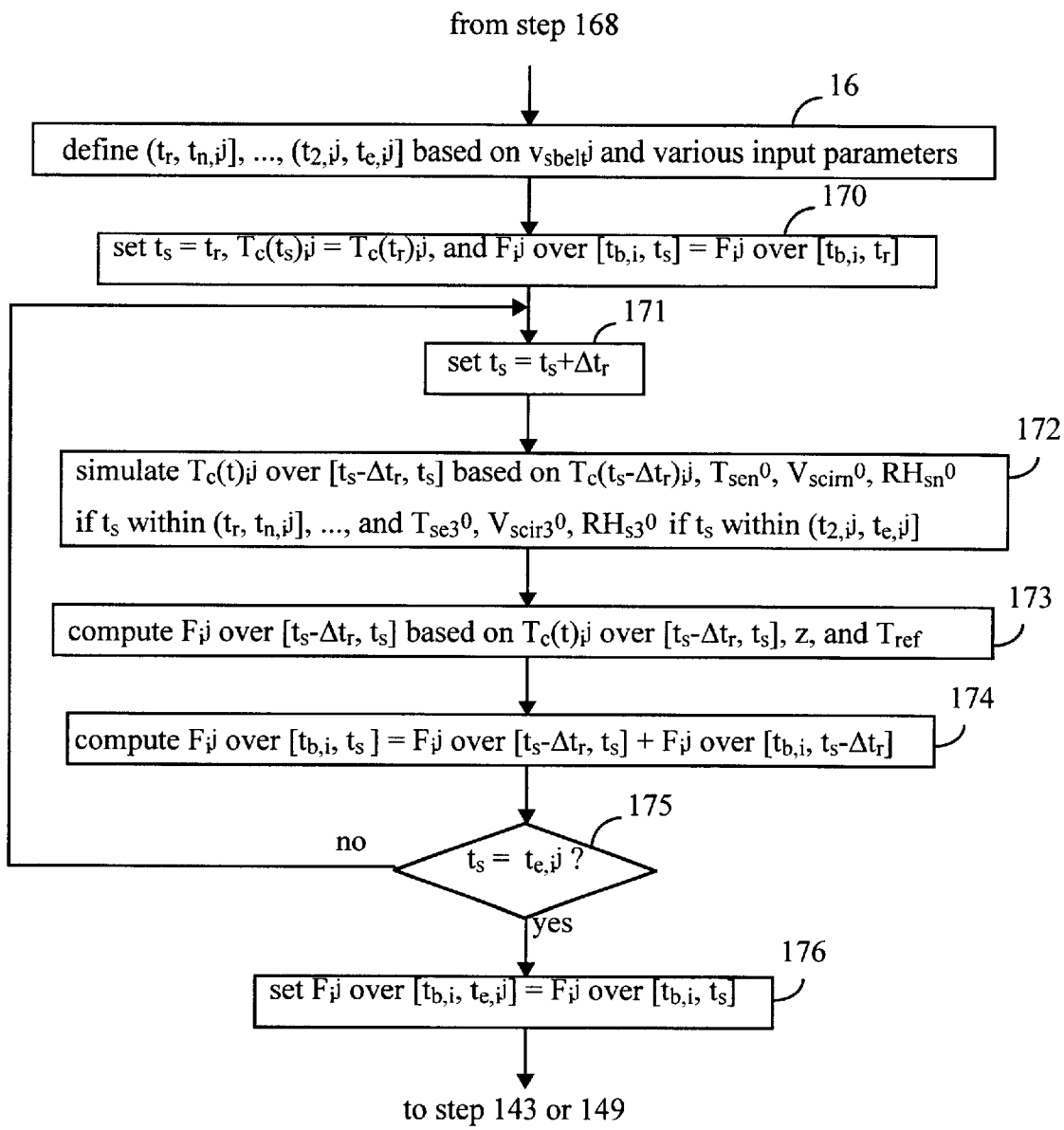

FIG. 8 shows the detailed process flow that the deviation program 125 (of FIG. 2) uses in steps 142 and 148 of FIG. 3 to compute the currently predicted accumulated lethality $F_i^j$ to be delivered to the core of a selected food item over the currently scheduled time interval $[t_{b,i}, t_{e,i}^j]$ that the food item is in the oven 102. In this case, the program iteratively performs a simulation of the predicted remaining portion of the continuous oven cooking process to be administered to this food item using sub-steps 169 to 176 of steps 142 and 148. Like steps 161 to 168, steps 169 to 176 are respectively similar to steps 151 to 158 of FIG. 6 and discussed in sub-section 1.c., except for the differences discussed next.

In step 169, the deviation program 125 (of FIG. 2) defines the remaining time intervals $(t_r, t_{n,i}^j], \ldots, (t_{4,i}^j, t_{e,i}^j]$ that the food item i is predicted to be in the respective cooking zones 109-n, ..., 3 after the current sample real time t. The definition of these time intervals in step 169 is based on the currently scheduled belt speed $v_{sbelt}^j$.

In step 170, the deviation program 125 (of FIG. 2) initially sets the initial sample simulation time $t_s$ to the current sample real time $t_r$. The program also initially sets the predicted core temperature $T_c(t)_i^j$ for the core of the food item i at this sample simulation time to the estimated actual core temperature $T_c(t_r)_i^j$ obtained from step 168 of FIG. 7. Moreover, the program initially sets the predicted accumulated lethality $F_i^j$ to be delivered to the core over the current simulation time interval $[t_{b,i}, t_s]$ to the estimated currently accumulated lethality $F_i^j$ over the actual time interval $[t_{b,i}, t_r]$ also obtained from step 168.

Then, the deviation program 125 (of FIG. 2) increments the current sample simulation time $t_s$ by the amount of the sampling period $\Delta t_r$ in step 171. This results in a new current sample simulation time $t_s$.

In step 172 of each iteration, the deviation program 125 (of FIG. 2) simulates the incremental portion of the core temperature-time profile $T_c(t)_i^j$ that is predicted to occur at the core of the food item i over the current simulation time increment $[t_s-\Delta t_r, t_s]$. This is done based on the predicted core temperature $T_c(t_s-\Delta t_r)_i^{i0}$ for the core at the previous sample simulation time $t_s-\Delta t_r$, the earlier discussed input parameters $\Delta t_r$, S, k, $C_p$, $\rho$, $L_v$, $\mu$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, $L_1$, $L_2$, $L_3$, $W_1$, $W_2$, and $W_3$, and the scheduled environment temperatures $T_{se1}^0$, $T_{se2}^0$, $T_{se3}^0$, the scheduled air circulation velocities $V_{scur1}^0$, $V_{scir2}^0$, and $V_{scir3}^0$, and the scheduled relative humidities $RH_{s1}^0$, $RH_{s2}^0$, and $RH_{s3}^0$. The simulation in step 172 is performed using the same simulation model mentioned earlier for step 154 of FIG. 6 and and step 164 of FIG. 7 and is discussed in more detail in sub-section 1.g.

In view of step 170, in the first iteration, the predicted core temperature $T_c(t_s-\Delta t_r)_i^0$ at the previous sample simulation time $t_s-\Delta t_r$ will be the estimated actual core temperature $T_c(t_r)_i^j$ obtained from step 168 of FIG. 7. However, in each subsequent iteration, this temperature is obtained from the portion of the core temperature profile $T_c(t)_i^0$ predicted over the previous simulation time increment $[t_s-2\Delta t_r, t_s-\Delta t_r]$ that was simulated in step 172 of the previous iteration.

Moreover, the simulation is based on the respective scheduled environment temperatures $T_{sen}^0, \ldots, T_{se3}^0$, scheduled air circulation velocities $V_{sairn}(t_s), \ldots, V_{sair3}(t_s)$, and scheduled relative humidities $RH_{sn}(t_s), \ldots, R_{s3}(t_s)$ of the cooking zones 109-n, ..., 3 when the current simulation time $t_s$ is within the corresponding simulation time intervals $(t_r, t_{n,i}^j], \ldots, (t_{2,i}^j, t_{e,i}^j]$. The time intervals $(t_r, t_{n,i}^j], \ldots, (t_{2,i}^j, t_{e,i}^j]$ indicate how long the food item i is scheduled to be in the respective cooking zones 109-n, ..., 3.

The lethality $F_i^j$ that is predicted to be delivered over the current simulation time increment $[t_s-\Delta t_r, t_s]$ is then computed by the deviation program 125 (of FIG. 2) in step 173 of each iteration. This is done based on the predicted portion of the core temperature-time profile $T_c(t)_i^j$ that was simulated over this time increment in step 172.

In step 174 of each iteration, the deviation program 125 (of FIG. 2) computes the predicted accumulated lethality $F_i^j$ to be delivered to the core of the food item i over the current simulation time interval $[t_{b,i}, t_s]$. This is done by adding the predicted accumulated lethality $F_i^j$ over the current simulation time increment $[t_s-\Delta t_r, t_s]$ from step 173 to the predicted accumulated lethality $F_i^j$ over the previous simulation time interval $[t_{b,i}, t_s-\Delta t_r]$.

Then, in step 175 of each iteration, the deviation program 125 (of FIG. 2) determines whether the current sample simulation time t, has reached the predicted end time $t_{e,i}^j$ for the food item i in the oven 102 (of FIG. 1). If it has not, then the program returns to step 171 for the next iteration. In this way, steps 171 to 175 are repeated in each subsequent iteration until it is determined that the predicted end time has been reached. When this finally occurs, the program sets in step 176 the predicted accumulated lethality $F_i^j$ over the current simulation time interval $[t_{b,i}, t_s]$ to the predicted accumulated lethality $F_i^j$ over the currently scheduled total time interval $[t_{b,i}, t_{e,i}^j]$.

1.f. Detailed Process Flow for Step 146 of FIG. 3

Figure 9:
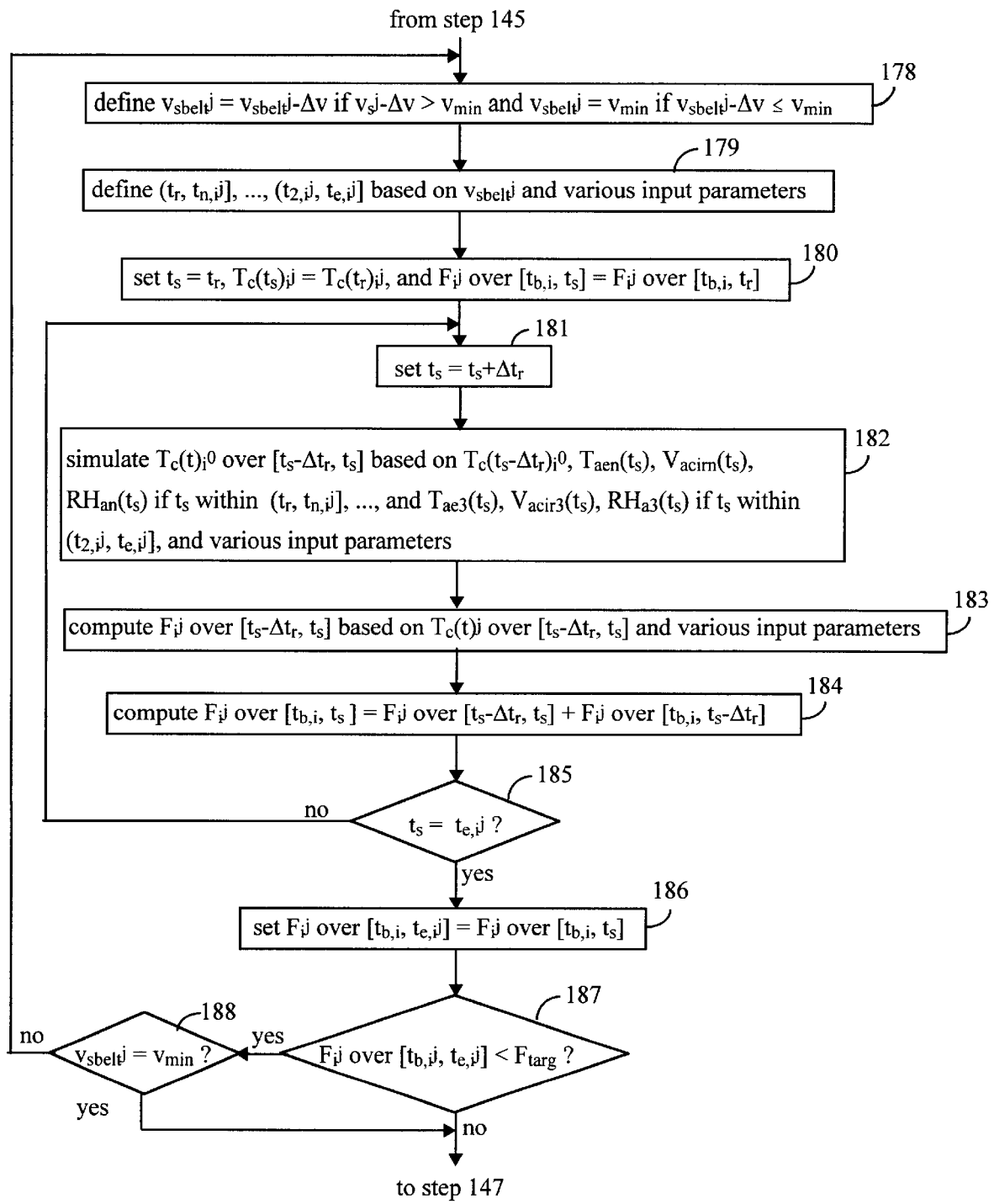

FIG. 9 shows the detailed process flow that the deviation program 125 uses in step 146 of FIG. 3 to re-define the currently scheduled belt speed $v_{sbelt}^j$. This program uses sub-steps 178 to 187 to iteratively perform a simulation of the remaining portion of the continuous oven cooking process predicted to be administered to the minimum lethality food item i identified in step 142 of FIG. 3 and discussed in sub-section 1.b. Steps 178 to 187 are respectively similar to steps 159 and 151 to 159 of FIG. 6 and discussed in sub-section 1.c., except for the differences discussed next.

In step 178, the deviation program 125 first decrements the currently scheduled belt speed $v_{sbelt}^j$ by the predefined belt speed offset $\Delta v$. If the decremented belt speed is greater than the minimum belt speed $v_{min}$, the currently scheduled belt speed is re-defined as the decremented belt speed. However, if the decremented belt speed is less than or equal to the minimum belt speed, then the currently scheduled belt speed is re-defined as the minimum belt speed.

Since a currently re-scheduled belt speed $v_{sbelt}^j$ is defined in step 178, the re-scheduled remaining time intervals $(t_r, t_{n,i}^j], \ldots, (t_{2,i}^j, t_{e,i}^j]$ that the minimum lethality food item i is predicted to be in the respective cooking zones 109-n, ..., 3 after the current sample real time $t_r$ need to be defined. This is done in step 179.

Step 180 to 186 are the same as steps 170 to 176 of FIG. 8 and discussed in sub-section 1.e. Thus, these steps are used to compute a currently predicted accumulated lethality $F_i^j$ to be delivered to the core of the minimum lethality food item i over the re-scheduled total time interval $[t_{b,i}, t_{e,i}^j]$. It should be noted here that this is done using the estimated accumulated lethality $F_i^j$ over $[t_{b,i}, t_r]$ and the actual core temperature $T_c(t_r)^j$ for the minimum lethality food item i computed in steps 161 to 168 of FIG. 7.

Then, in step 187, the deviation program 125 determines if the currently predicted accumulated lethality $F_i^j$ over $[t_{b,i}, t_{e,i}^j]$ satisfies the target lethality $F_{targ}$. If it does not, then the program determines in step 188 whether the re-scheduled belt speed $v_{sbelt}^j$ equals the minimum belt speed $v_{min}$. If it does not, then steps 181 to 188 are repeated until it is determined in step 187 that the target lethality has been satisfied or it is determined in step 188 that the minimum belt speed has been reached. In this way, the belt speed is re-scheduled.

1.g. Detailed Process Flow for Step 154 of FIG. 6, Step 164 of FIG. 7, Step 172 of FIG. 8, and Step 182 of FIG. 9

Figure 10:
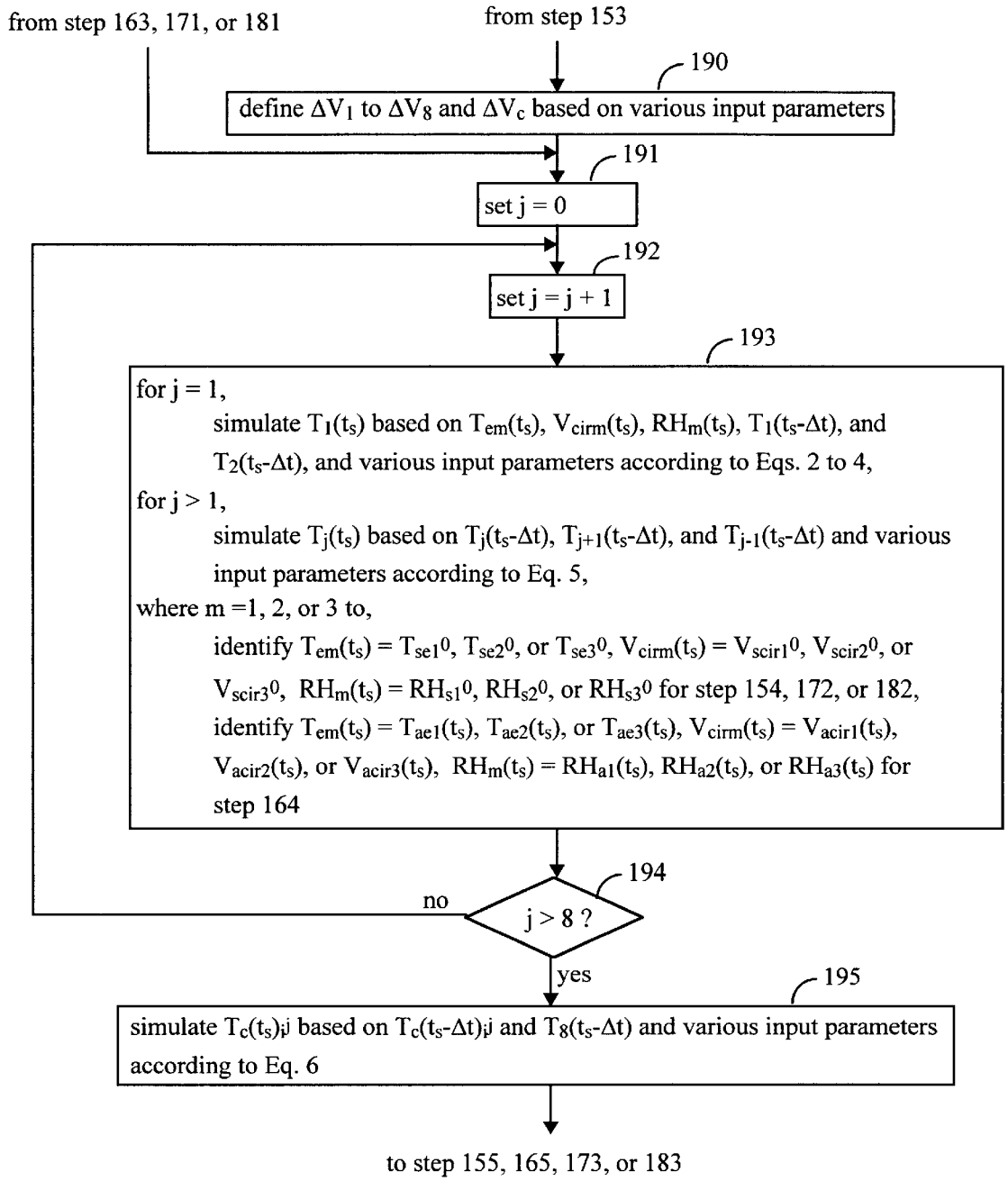
FIG. 10 shows a more detailed process flow diagram for steps in the detailed process flow diagrams of FIGS. 6 to 9 for simulating a core temperature.

In sub-sections 1.c., 1.d., 1.e. and 1.f., a core temperature $T_c(t_s)_i^j$ is simulated for a food item i using step 154 of FIG. 6, step 164 of FIG. 7, step 172 of FIG. 8, and step 182 of FIG. 9. In performing these steps, the scheduling program 124 and the deviation program 125 call up the simulation program 126 of FIG. 2. The same detailed simulation flow diagram is used for all of these steps and is shown in FIG. 10. Each of these steps will include the sub-steps 191 to 195 while step 154 additionally includes the sub-step 190.

In order to perform this simulation for the food item i, the simulation program 126 (of FIG. 2) implements a finite difference model using volume elements to simulate the heat transfer in the food item. This finite difference model is based on the physical geometry of the food item to be cooked. For example, for a flat type of food item, such as a chicken filet or meat patty, the finite difference model may be one dimensional. But, for a rounder type of food item, such as a chicken nugget, the finite difference model may be two or three dimensional.

Figure 11:
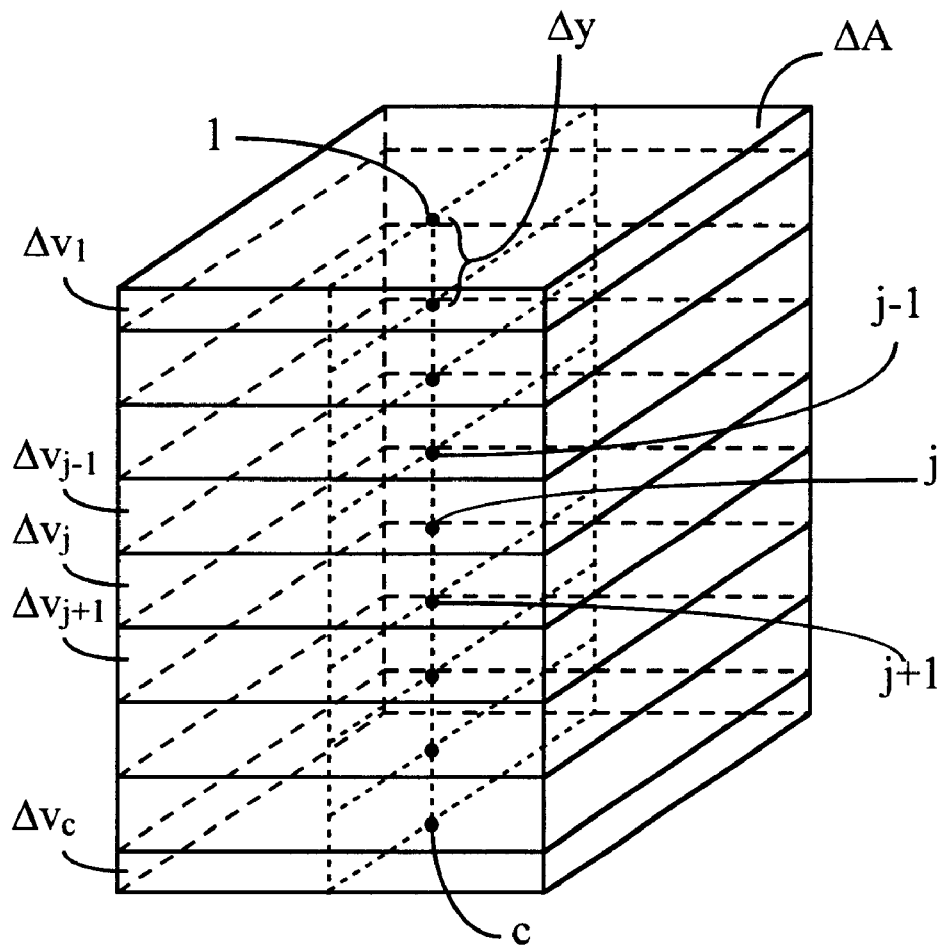
FIG. 11 shows a nodal system for volume elements used in the detailed flow diagram of FIG. 10

FIG. 11 provides an example of the finite difference model to be discussed in conjunction with steps 190 to 195. Here, the finite difference model is one dimensional in that it uses volume elements $\Delta V_1$ to $\Delta V_8$ and $\Delta V_c$ defined by a one dimensional nodal system with corresponding nodes 1 to 8 and c. These volume elements are used to model the heat transfer across the thickness of the food item at a particular simulation time epoch $t_s$. This is done by simulating the corresponding temperatures $T_1(t_s)$ to $T_8(t_s)$ in the corresponding volume elements $\Delta V_1$ to $\Delta V_8$ from which the core temperature $T_c(t_s)_i^j$ in the volume element $\Delta V_c$ can be simulated.

Step 154 of FIG. 6 is the first time that a simulation will be done in the continuous oven cooking process. Thus, the volume elements are defined by the simulation program 126 (of FIG. 2) for the entire continuous oven cooking process in step 190 after step 153 of FIG. 6. This is done based on the size information S of the food item in the manner discussed next.

The volume elements $\Delta V_1$ to $\Delta V_8$ and $\Delta V_c$ lie in the cross section of the food item i along the thickness of the food item are constructed in the nodal system using an index j, in the manner shown in FIG. 11. Each node j is used to identify a corresponding volume element $\Delta V_j$ and temperature $T_j(t_s)$ in the volume element at the node. Similarly, the node c is used to identify the volume element $\Delta V_c$ at the core and the temperature $T_c(t_s)^j$ in the volume element at that node.

As those skilled in the art will recognize, the number of nodes 1 to J and c (and therefore the number of volume elements $\Delta V_1$ to $\Delta V_j$ and $\Delta V_c$) used is based on the size information S (in particular the thickness) of the food item i provided in step 134 of FIG. 3. In the example shown in FIG. 11, the index j ranges from 1 to J=8 so that 9 nodes 1 to 8 and c (and 9 volume elements $\Delta_1$ to $\Delta V_8$ and $\Delta V_c$) are used.

The volume elements $\Delta V_1$ to $\Delta V_8$ and $\Delta V_c$, are each defined to have the same surface area $\Delta A$ on both sides that are parallel to the surface of the food item i. The distance $\Delta y$ between each node j and the adjacent node j+1 or c is along the direction of the j index. The surface area $\Delta A$ and the distance $\Delta y$ are determined based on the size information S of each food item i provided in step 134 of FIG. 3 and the nodal system constructed in FIG. 11.

As mentioned earlier, each of the steps 154 of FIG. 6, 164 of FIG. 7, 172 of FIG. 8, and 182 of FIG. 9, have steps 191 to 195 of FIG. 10 as sub-steps. Thus, after step 190 of FIG. 10, step 163 of FIG. 7, step 171 of FIG. 8, or step 181 of FIG. 9, the simulation program 126 (of FIG. 2) performs step 191. In step 191, the index j is set to 0. Steps 192 to 194 are then used by the simulation program 126 (of FIG. 2) to simulate the temperatures $T_1(t_s)$ to $T_8(t_s)$ in the volume elements $\Delta V_1$ to $\Delta V_8$ in loop fashion.

In step 192 of each loop, the simulation program 126 of FIG. 2 increments the previous index j by one to compute the current index j. In the first iteration, the current index j will be set to 1 in view of step 191.

Then, in step 193 of each loop, the temperature $T_j(t_s)$ in the corresponding volume element $\Delta V_j$ at the current simulation time epoch $t_s$ is simulated. This simulation depends on the value of the index j.

Specifically, for the volume element $\Delta V_1$ at the surface of the food item i, step 193 is performed based on the input parameters k, $C_p$, $\rho$, $L_v$, A, B, $\alpha$, $\beta$, r, $C_0$, $D_1$, $D_2$, $D_3$, $E_1$, $E_2$, $E_3$, $F_1$, $F_2$, $F_3$, $G_0$, $H_0$, $M_0$, $N_0$, $L_m$, $W_m$, an environment temperature $T_{em}(t_s)$, an air circulation velocity $v_{airm}(t_s)$, and a relative humidity $RH_m(t_s)$ at the current simulation time epoch $t_s$, the temperatures $T_1(t_s-\Delta t)$ and $T_2(t_s-t)$ in the adjacent volume elements $\Delta V_1$ and $\Delta V_2$ at the previous simulation time epoch $t_s-\Delta t$, the surface area $\Delta A$, and the distance $\Delta y$.

The index m=1, 2, or 3 identifies the corresponding cooking zone 109-1, 2, or 3 for which the simulation is being performed. Therefore, the index m also identifies the corresponding length information $L_m$ and width information $W_m$ being used in the simulation from among the length information $L_1$, $L_2$, or $L_3$ and width information $W_1$, $W_2$, or $W_3$. Furthermore, for steps 154, 172, and 182, the index m also identifies the corresponding environment temperature $T_{em}(t_s)$, air circulation velocity $V_{airm}(t_s)$, and relative humidity $RH_m(t_s)$ being used in the simulation from among the scheduled environment temperatures $T_{se1}^0$, $T_{se2}^0$, $T_{se3}^0$, the scheduled air circulation velocities $V_{scir1}^0$, $V_{scir2}^0$, and $V_{scir3}^0$, and the scheduled relative humidities $RH_{s1}^0$, $RH_{s2}^0$, and $RH_{s3}^0$. Similarly, for step 164, the index m identifies the corresponding environment temperature $t_{em}(t_s)$, air circulation velocity $V_{airm}(t_s)$, and relative humidity $RH_m(t_s)$ being used in the simulation from among the actual environment temperatures $T_{ae1}(t_s)$, $T_{ae2}(t_s)$, $T_{ae3}(t_s)$, the actual air circulation velocities $V_{acir1}(t_s)$ $V_{acir2}(t_s)$ and $V_{scir3}(t_s)$, and the scheduled relative humidities $RH_{a1}(t_s)$, $RH_{a2}(t_s)$, and $RH_{a3}(t_s)$.

In the case of the volume element $\Delta V_1$ at the surface of the food item i, step 193 is performed according to:

$$\rho C_p \Delta V \frac{T_1(t_s) - T_1(t_s - \Delta t_r)}{\Delta t_r} = h(t_s)\Delta A(T_e(t_s) - T_1(t_s - \Delta t_r)) + \\ k\Delta A \frac{T_1(t_s) - T_1(t_s - \Delta t_r)}{\Delta y} - \\ \rho L_v d\, m/dt(t_s) \qquad (2)$$

where $h(t_s)$ is the surface heat transfer coefficient, $dm/dt(t_s)$ is the rate of moisture loss, The surface heat transfer coefficient $h(t_s)$ is a function of the environment temperature $T_e(t_s)$ and the air circulation velocity $V_{air}(t_s)$ and is given by:

$$h(t_s) = \frac{k}{W_m}(A + B(W_m V_{cirm} \rho / \mu)^\alpha + (C_p \mu / k)^\beta + (L_m/W_m)^r) \qquad (3)$$

where $hW_m/k$ is the well known Nusselt number, $W_m\rho/\mu$ is the well known Reynolds number, and $C_p\mu/k$ is the well known Pranatl number. Similarly, the rate of moisture loss dm/dt($t_s$) is a function of the environment temperature $T_e(t_s)$, the air circulation velocity $V_{air}(t_s)$, and the relative humidity $RH(t_s)$ and is given by:

$$dm/dt(t_s) = C_0 + \sum_{q=1}^{3} D_q(T_{em}(t_s))^q + \sum_{q=1}^{3} E_q(V_{cirm}(t_s))^q +$$

$$\sum_{q=1}^{3} F_q(RH_m(t_s))^q + G_0 T_{em}(t_s) RH_m(t_s) +$$

$$H_0 T_{em}(t_s) V_{airm}(t_s) + M_0 RH_m(t_s) V_{airm}(t_s) +$$

$$N_0 T_{em}(t_s) RH_m(t_s) V_{airm}(t_s)$$

For each of the volume elements $\Delta V_2$ to $\Delta V_8$ in the interior of the food item i, step 193 is performed in a similar manner to that just described for the surface volume element $\Delta V_1$. However, for each volume element $\Delta V_j$ in this case, the input parameter h is not used but the temperature $T_{j+1}(t_s - \Delta t)$ in the adjacent volume element $\Delta V_{j+1}$ at the previous time epoch $t_s - \Delta t$ is used. This is due the fact that this volume element is in the interior of the food item and will have a volume element $\Delta V_{j+1}$ above it and below it. In this case, the simulation is done according to:

$$\rho C_p \Delta V \frac{T_j(t_s) - T_j(t_s - \Delta t_r)}{\Delta t_r} = k \Delta A \frac{T_{j-1}(t_s - \Delta t_r) - T_j(t_s - \Delta t_r)}{\Delta y} + \quad (5)$$

$$k \Delta A \frac{T_{j+1}(t_s - \Delta t_r) - T_j(t_s - \Delta t_r)}{\Delta y}$$

In step 194 of each loop for the index, the simulation program 126 (of FIG. 2) determines if the index has reached 8. If it has not, then steps 192 and 193 are repeated until this is finally determined. In this way, all of the temperatures $T_1(t_s)$ to $T_8(t_s)$ in the corresponding volume elements $\Delta V_1$ to $\Delta V_8$ are simulated in the loop.

Then, in step 195, the temperature $T_c(t_s)^j$ in the final volume element $\Delta V_c$ is simulated by the simulation program 126 (of FIG. 2). This is done in a similar manner to which the temperature $T_j(t_s)$ for each interior volume element $\Delta V_j$, where j=1 to 8, is simulated. However, for the center volume element $\Delta V_c$, the temperature $T_{j+1}(t_s - \Delta t)$ in the adjacent volume element $\Delta V_{j+1}$ at the previous time epoch $t_s - \Delta t$ is not used. This is due the fact that this volumne element is at the core of the food item i and will not have a volume element $\Delta V_{j+1}$ below it. In this case, the simulation is done according to:

$$\rho C_p \Delta V \frac{T_c(t_s) - T_c(t_s - \Delta t_r)}{\Delta t_r} = k \Delta A \frac{T_{j-1}(t_s - \Delta t_r) - T_c(t_s - \Delta t_r)}{\Delta y} \quad (6)$$

The process control program 123 (of FIG. 2) will then proceed to step 155 of FIG. 6, step 165 of FIG. 7, step 173 of FIG. 8, or step 183 of FIG. 9. This is done in the manner discussed in sub-sections 1.c., 1.d., 1.e., and 1.f.

2. Alternative Embodiments

As indicated earlier, the embodiment of the controller 104 of FIGS. 1 and 2 that is associated with FIGS. 3 to 11 and described in section 1. is an exemplary embodiment. Alternative embodiments that utilize the principles and concepts developed in FIGS. 3 to 11 and section 1. do exist. Some of these embodiments are discussed next.

2.a. Using Target Temperature $T_{targ}$

In the approach described in section 1., the controller 104 of FIGS. 1 and 2 is configured to administer the continuous oven cooking process based on satisfying the target lethality $F_{targ}$. However, in an alternative approach, the controller 104 could be configured to instead administer the process based on satisfying the target temperature $T_{targ}$ discussed earlier. Since these embodiments are similar, only the major differences will be discussed next.

Referring to FIG. 3, in this alternative embodiment, the target temperature $T_{targ}$ would be included as an input parameter in step 134 instead of the target lethality $F_{targ}$. As mentioned earlier, the target temperature $T_{targ}$ is set by the FDA and/or the USDA.

Then, in step 135, the initially scheduled belt speed $v_{sbelt}^0$ would be defined based on the target temperature $T_{targ}$ instead of the target lethality $F_{targ}$. As a result, sub-steps 155 and 156 of FIG. 6 would be removed from step 135, sub-step 152 of FIG. 6 would be changed for step 135 to not include setting $F_i^0$ over $[0, t_s]=0$, sub-step 158 of FIG. 6 would be changed for step 135 to set the initially scheduled core temperature $T_c(\Delta t_{1,i}^0 + \Delta t_{2,i}^0 + \Delta t_{3,i}^0)_i^0$ to the predicted core temperature $T_c(t_s)_i^0$ at the current simulation time $t_s$ (i.e., set $T_c(\Delta t_{1,i}^0 + \Delta t_{2,i}^0 + \Delta t_{3,i}^0)_i^0 = T_c(t_s)_i^0$), and sub-step 159 of FIG. 6 would be changed for step 135 to determine if the initially scheduled core temperature $T_c(\Delta t_{1,i}^0 + \Delta t_{2,i}^0 + \Delta t_{3,i}^0)_i^0$ is less than the target temperature $T_{targ}$(i.e., $T_c(\Delta t_{1,i}^0 + \Delta t_{2,i}^0 + \Delta t_{3,i}^0)_i^0 < T_{targ}$). Step 135 would of course also result in the definition of the initially scheduled time durations $\Delta t_{1,i}^0$, $\Delta t_{2,i}^0$, and $\Delta t_{3,i}^0$, the initially scheduled core temperature-time profile $T_c(t)_i^0$, the initially scheduled accumulated lethality $F_i^0$ over $[0, \Delta t_{1,i}^0 + \Delta t_{2,i}^0 + \Delta t_{3,i}^0]$, the intially scheduled total environment temperaturetime profile $T_{se}(t)_i^0$, the initially scheduled total air circulation velocity-time profile $v_{scir}(t)_i^0$, and the initially scheduled total relative humidity-time profile $RH_s(t)_i^0$.

In step 142, the food item i that at the current sample real time $t_r$ has the minimum core temperature $T_c(t_{e,i}^j)_i^j$ currently predicted to be delivered to its core over its currently scheduled time interval $[t_{b,i}, t_{e,i}^j]$ in the oven 102 (of FIG. 1) is identified instead of the food item i with the minimum accumulated lethality $F_i^j$ over $[t_{b,i}, t_{e,i}^j]$. This minimum core temperature food item i is identified in a similar manner as that described in section 1.c. for the minimum lethality food item, except that currently predicted core temperatures $\{ \ldots, T_c(t_{e,i}^j)_i^j, \ldots \}_{se1}$ f are evaluated for selected food items $\{ \ldots, i, \ldots \}_{se1}$ of the food items $\{ \ldots, i, \ldots \}_{aff}$ that are currently affected by the deviation. Furthermore, sub-steps 165 and 166 of FIG. 7 would be removed from step 142, sub-step 162 of FIG. 7 would be changed for step 142 to not include setting $F_i^0$ over $[t_{b,i}, t_s]=0$, sub-step 168 of FIG. 7 would be changed for step 142 to not include setting $F_i^0$ over $[t_{b,i}, t_r]=F_i^0$ over $[t_{b,i}, t_s]$, sub-steps 173 and 174 of FIG. 8 would be removed from step 142, sub-step 170 of FIG. 8 would be changed for step 142 to not include setting $F_i^0$ over $[t_{b,i}, t_s]=F_i^0$ over $[t_{b,i}, t_r]$, and sub-step 176 of FIG. 8 would be changed for step 142 to instead set the currently predicted core temperature $T_c(t_{e,i}^j)_i^j$ at the currently scheduled end time $t_{e,i}^j$ to the predicted core temperature $T_c(t_s)_i^j$ at the current simulation time $t_s$ (i.e., set $T_c(t_{e,i}^j)_i^j = T_c(t_s)_i^j$).

Steps 143 and 147 of FIG. 3 would also have to be changed. Specifically, they would be changed so as to determine if the currently predicted core temperature $T_c(t_{e,i}^j)_i^j$ at the currently scheduled end time $t_{e,i}^j$ for the minimum core temperature food item i is less than the target temperature $T_{targ}$(i.e., $T_c(t_{e,i}^j)_i^j < T_{targ}$?).

In step 146 of FIG. 3, the currently scheduled belt speed $V_{sbelt}^0$ would be defined based on the target temperature $T_{targ}$ instead of the target lethality $F_{targ}$. This would be similar to step 142 for defining the initially scheduled belt speed $v_{sbelt}^0$. As a result, sub-steps 183 and 184 of FIG. 9 would be removed from step 146, sub-step 180 of FIG. 9 would be changed for step 146 to not include setting $F_i^0$ over $[t_{b,i}, t_s]=F_i^0$ over $[t_{b,i}, t_r]$ sub-step 186 of FIG. 9 would be changed to instead set the currently predicted core temperature $T_c(t_{e,i}^j)_i^j$ at the currently scheduled end time $t_{e,i}^j$ to the predicted core temperature $T_c(t_s)_i^j$ at the current simulation time t (i.e., set $T_c(t_{e,i}^j)_i^j = T_c(t_s)_i^j$), and sub-step 187 of FIG. 9 would be changed so as to instead determine if the currently predicted core temperature $T_c(t_{e,i}^j)_i^j$ is less than the target temperature $T_{targ}$ (i.e., $T_c(t_{e,i}^j)_i^j < T_{targ}$?).

Similarly, step 148 would be changed to identify the under cooked food items { ..., i, ... }$_{under}$ that will have currently predicted core temperatures { ..., $T_c(t_{e,i}^j)_i^j$, ... }$_{under}$ that are less than the target temperature $T_{targ}$. In identifying the under cooked food items in step 148, a similar approach as that used in step 142 to identify the minimum core temperature food item i would be used. But, in this case, the additional criteria of the target temperature is used to expand the search.

As those skilled in the art will recognize, the controller 104 of FIGS. 1 and 2 (and therefore the programs 123 to 126) could be configured to implement both of the approaches described in section 1. and here in section 2.a. This would provide additional security to ensure that the food items { ..., i, ... }$_{line}$ satisty both the target lethality $F_{targ}$ and the target temperature $T_{targ}$.

2.b. Scheduling and Re-Scheduling Variations

The operator of the continuous oven cooking process 100 of FIG. 1 may want to keep the initially scheduled belt speed $v_{sbelt}^0$, the initially scheduled environment temperatures $T_{se1}^0$, $T_{se2}^0$, and $T_{se3}^0$, the initially scheduled air circulation velocities $V_{scir1}^0$, $V_{scir2}^0$ and $V_{scir3}^0$, and the initially scheduled relative hunidities $Rh_{s1}^0$, $RH_{a2}^0$, and $RH_{s3}^0$ constant throughout the entire continuous oven cooking process. Thus, in this embodiment, the deviation program 125 (of FIG. 2) is simply used to identify the under cooked food items { ..., i, ... }$_{under}$ in the manner discussed earlier in sub-section 1.b. when a temperature deviation occurs. More specifically, the steps 145 to 147 would be eliminated from the flow diagram of FIG. 3.

In another embodiment, one or more of the initially scheduled environment temperatures $T_{se1}^0$, $T_{se2}^0$, $T_{se3}^0$, initially scheduled air circulation velocities $V_{scir1}^0$, $V_{scir2}^0$, and $V_{scir3}^0$, and initially scheduled relative humidities $RH_{s1}^0$, $RH_{s2}^0$, and $RH_{s3}^0$, may be re-scheduled when a deviation occurs. In this case, the deviation program 125 (of FIG. 2) would re-define one or more currently scheduled environment temperatures $T_{se1}^j$, $T_{se2}^j$, and $T_{se3}^j$, currently scheduled air circulation velocities $V_{scir1}^j$, $V_{scir2}^j$, and $V_{scir3}^j$, and currently scheduled relative humidities $RH_{s1}^j$, $RH_{s2}^j$, and $RH_{s3}^j$ each time a deviation occurred in a similar manner to which it re-defined the currently scheduled belt speed $v_{sbelt}^j$ in step 146 of FIG. 3 and steps 178 to 188 of FIG. 9. In this embodiment, the initially scheduled belt speed $v_{sbelt}^0$ may be kept constant or a currently scheduled belt speed $v_{sbelt}^j$ may also be re-defined each time a deviation occurs.

2.c. Identifying and Segregating Over Cooked Food items

Since the cuurently scheduled belt speed $v_{sbelt}^j$ may be re-defined when a deviation occurs, it is possible that some of the food items {1, ..., i, ..., } may be over cooked due to the slower currently scheduled belt speed. In this case, a maximum lethality $F_{max}$ may be defined and included as one of the input parameters. Then, the over cooked food items { ..., i, ... }$_{over}$ with currently predicted accumulated lethalities { ..., $F_i^j$ over $[t_{b,i}, t_{e,i}^j]$, ... }$_{over}$ over this maximum lethality would be identified in a similar manner to that way in which the under cooked food items { ..., i, ... }$_{under}$ are identified in step 148 of FIG. 3 and discussed in sub-section 1.b. These food items would be segregated in the same way that the under cooked food items are segregated in step 141 of FIG. 3. As aresult, the remaining food items that are not under or over cooked would have a uniform quality food product using this technique.

2.d. More Conservative Approaches

In steps 142 and 148 of FIG. 3 discussed in sub-section 1.b. and in steps 161 to 168 of FIG. 7 discussed in sub-section 1.d., an aggressive approach was discussed for simulating the actual portion of the core temperature-time profile $T_c(t)_i^j$ that occurs over the actual time interval $[t_{b,i}, t_r]$ that a food item i has been in the oven 102 (of FIG. 1). Specifically, this portion of the core temperature-time profile is based on the actual environment temperature-time profiles $T_{ae1}(t)$, ..., $T_{aen}(t)$, the actual air circulation velocity-time profiles $V_{acir1}(t)$, ..., $V_{acirm}(t)$, and the actual relative humidity-time profiles $RH_{a1}(t)$, ..., $HR_{an}(t)$ over the corresponding time intervals However, a more conservative embodiment could be employed. This approach uses only the portion of the actual environment temperature-time profile $T_{aen}(t)$, the actual air circulation velocity-time profile $V_{acirm}(t)$, and the actual relative humidity-time profile $RH_{an}(t)$ over the time interval from the time when the food item i is first affected by the deviation to the current sample real time $t_r$.

Thus, if the food item enters the cooking zone 109-n while the temperature deviation is occurring, the portion of the core temperature-time profile $T_c(t)_i^j$ over the time interval $(t_{n-1,i}^j, t_r]$ would still be based on the portion of the actual environment temperature-time profile $T_{aen}(t)$, the actual air circulation velocity-time profile $V_{acirm}(t)$, and the actual relative humidity-time profile $RH_{an}(t)$ over this time interval. However, the portion of the core temperature-time profile $T_c(t)_i^j$ over the time intervals $[t_{b,i}, t_{1,i}^j], ..., (t_{n-2,i}^j, t_{n-1,i}^j]$ would be based on the corresponding scheduled environment temperatures $T_{se1}^0, ..., T_{sen-1}^0$ for the cooking zones 109-1, ..., n-1 in which the temperature deviation is not occurring.

On the other hand, if the temperature deviation begins at the deviation begin time td while the food item is already in the cooking zone 109-n, then the portion of the core temperature-tine profile over the time interval $(t_{n-1,i}^j, t_d]$ would be based on the scheduled environment temperature $T_{sen}^0$, the scheduled air circulation velocity $V_{scir}^0$, and the scheduled relative humidity $RH_s^0$. In this case, only the portion of the core temperature-time profile over the time interval $(t_d, t_r]$ would be based on the portion of the actual environment temperature-time profile $T_{aen}(t)$, the actual air circulation velocity-time profile $V_{acirm}(t)$, and the actual relative humidity-time profile $RH_{an}(t)$ over this time interval. In either case, this results in the currently estimated accumulated lethality $F_1^j$ delivered over the time interval $[t_{b,i}, t_r]$ being computed more conservatively in steps 142 and 148 of FIG. 3 andinsub-steps 161 to 168 of FIG. 7.

Similarly, the actual initial core temperature $T_{ai}(t_{b,i})$ for a food item i was used in steps 142 and 148 of FIG. 3 and in sub-steps 161 to 168 of FIG. 7 of FIG. 7 for computing the actual lethality $F_i^j$ over $[t_{b,i}, t_r]$. However, rather than using this actual initial product temperature, the scheduled initial product temperature $T_{sIP}$ may be used. This also results in the actual lethality being more conservative.

2.e. More Aggressive Approaches

A more aggressive approach than that described earlier in sub-section 1.c. can be taken for defining the initially scheduled belt speed $v_{sbelt}^0$. In this approach a first additional step could be added after step 159 of FIG. 6 to determine whether the predicted total lethality $F_i^0$ over $[0, \Delta t_1^0 + \ldots + \Delta t_4^0]$ is within the target total lethality $F_{targ}$ by a predefined lethality tolerance $\Delta F$. If this is the case, the belt speed obtained in step 160 in the last iteration is used as the initially scheduled belt speed. However, if this is not the case, then the belt speed from the last iteration is overly conservative. As a result, a second additional step may be added to increase this belt speed by, for example, $0.5\Delta v$. Steps 151 to 159 and the two additional steps are then repeated until the first additional step is satisfied. In this way, the initially scheduled belt speed is further refined in an aggressive manner.

Similarly, a more aggressive approach can also be taken for defining the re-scheduled belt speed $v_{sbelt}^j$. In this case, the steps 178 to 188 of FIG. 9 discussed in sub-section 1.f. would also include the two additional steps just described.

Furthermore, in steps 142 and 148 of FIG. 3 discussed in sub-section 1.b. and in steps 161 to 168 of FIG. 7 discussed in sub-section 1.d., an approach was discussed for simulating the actual portion of the core temperature-time profile $T_c(t)_i^j$ that occurs over the actual time interval $[t_{b,i}, t_r]$ that a food item i has been in the oven 102 (of FIG. 1). In this approach, the scheduled belt speed-time profile $v_{sbelt}(t)$ was used. However, a more aggressive approach can be taken in steps 142 and 148 of FIG. 3 and step 161 of FIG. 7 by using instead the actual belt speed-time profile $v_{abelt}(t)$. This profile would be compiled in step 139 of FIG. 3 by recording the actual belt speed $v_{abelt}(t_r)$ at each real sample time $t_r$.

2.f. Deviations in Scheduled Initial Product Temperature and/or Belt Speed

In addition to deviations in the scheduled environment temperatures $T_{se1}^0$, $T_{se2}^0$, and $T_{se3}^0$, scheduled air circulation velocities $V_{scir1}^0$, $V_{scir2}^0$, and $V_{scir3}^0$, and scheduled relative humidities $RH_{s1}^1$, $RH_{s2}^0$, and $RH_{s3}^0$, there may be deviations in other scheduled parameters of the continuous oven cooking process. For example, deviations in the actual core temperature $T_{af}(t_r)$ of the food items $\{1, \ldots, i, \ldots, I\}_{line}$ from the scheduled initial core temperature $T_{sI}$ may occur. Similarly, it is possible that deviations in the actual belt speed $v_{abelt}(t_r)$ of the belt 107 (of FIG. 1) from the currently scheduled belt speed $V_{sbelt}^j$ will occur. These deviations would be detected by monitoring the actual initial core temperature-time profile $T_{af}(t)$ and the actual belt speed-time profile $v_{abelt}(t)$. Thus, in step 139 of FIG. 3, the actual belt speed-time profile $v_{abelt}(t)$ would be compiled by recording the actual belt speed $v_{abelt}(t_r)$ at each real sample time $t_r$ and would be used in steps 142 and 148 of FIG. 3 and step 161 of FIG. 7 instead of the scheduled belt speed-time profile $v_{sbelt}(t)$.

The controller 104 would then be configured to also handle any of these kinds of deviations in order to identify any under and/or over cooked food items $\{\ldots, i, \ldots\}_{under}$ and/or $\{\ldots, i, \ldots\}_{over}$ resulting from the deviation. This would be done in a similar manner to that described earlier in sub-sections 1.b. to 1.e. for temperature, air circulation velocity, and relative humidity deviations in the scheduled environment temperatures.

2.g. Line with Rows

The present invention has been described in the context of a line of food items $\{\ldots, i, \ldots\}_{line}$ being conveyed through the continuous oven cooking system 100. As those skilled in the art will recognize, the invention can be similarly practiced on a line of rows of food items. In this case, each row is treated in the same way that each food item i was treated in section 1. and the other sub-sections of section 2.

2.h. Other Continuous Source Cooking Systems

The present invention has been described in the context of a continuous oven cooking system 100. However, as those skilled in the art will recognize, the invention can be similarly practiced in any other continuous source cooking system in which food items or carriers of food items are conveyed in line through a chamber in which the food items are cooked.

3. Conclusion

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of administering a continuous oven cooking process in an oven on a continuous line of food items, the method comprising the steps of:

controlling the oven to perform the continuous oven cooking process according to scheduled parameters; and in response to a deviation in a specific one of the scheduled parameters, identifying specific ones of the food items that have (a) currently predicted accumulated lethalities predicted to be delivered to them during the continuous oven cooking process that are less than a target lethality and/or (b) core temperatures at their cores at the end of the continuous oven cooking process that are less than a target core temperature.

2. The method of claim 1 wherein the specific one of the scheduled parameters is an environment temperature, air circulation velocity and/or relative humidity in a cooking zone of the oven through which the line of food items is conveyed.

3. The method of claim 1 further comprising the step of:

compiling an actual environment temperature-time profile, an actual air circulation velocity-time profile and an actual relative humidity-time profile for a cooking zone of the oven, and wherein the identifying step comprises the steps of:

selecting at least some of the food items affected by the deviation; and for each of the selected food items that has been conveyed into the cooking zone during the deviation, simulating a core temperature-time profile for the core of the food item based on the actual environment temperature profile, the actual air circulation velocity-time profile and the actual relative humidity-time profile; and determining whether the core temperature-time profile satisfies the target temperature.

4. The method of claim 3 wherein the core temperature-time profile includes a first portion over an actual time interval from an actual begin time when the food item enters the oven to a current sample real time and a second portion over a scheduled time interval from the current sample real time to a scheduled end time when the food item is to exist the oven;

the first portion of the core temperature-time profile over the actual time interval being based on at least a portion of the actual environment temperature profile, on at least a portion of the actual environment temperature profile, on at least a portion of the air circulation velocity-time profile, and on at least a portion of the actual relative humidity-time profile over a time interval from a time when the food item is first affected by the deviation to the current sample real time;

the scheduled parameters include an environment temperature, air circulation velocity and relative humidity; and the second portion of the core temperature-time profile being based on the scheduled environment temperature, on the scheduled air circulation velocity and on the scheduled relative humidity.

5. The method of claim 1 further comprising the step of:

compiling an actual environment temperature-time profile, an actual air circulation velocity-time profile and an actual relative humidity-time profile for a cooking zone of the oven, and wherein the identifying step comprises the steps of:
selecting at least some of the food items affected by the deviation; and
for each of the selected food items that has been conveyed into the cooking zone during the deviation,
simulating a core temperature-time profile for the core of the food item based on the actual environment temperature profile, the actual air circulation velocity-time profile and the actual relative humidity-time profile;
computing the currently predicted accumulated lethality to be delivered to the food item during the continuous oven cooking process based on the core temperature-time profile; and
determining whether the currently predicted accumulated lethality to be delivered to the food item satisfies the target lethality.

6. The method of claim 5 wherein the currently predicted accumulated lethality is the sum of (1) an estimated accumulated lethality delivered over an actual time interval from an actual begin time when the food item enters the oven to a current sample real time and (2) a predicted accumulated lethality to be delivered over a scheduled time interval from the current sample real time to a scheduled end time when the food item is to exist the oven.

7. The method of claim 6 wherein the estimated accumulated lethality delivered over the actual time interval is based on a first portion of the core temperature-time profile over the actual time interval, the first portion of the core temperature-time profile being based on at least a portion of the actual environment temperature profile, on at least a portion of the actual environment temperature profile, on at least a portion of the air circulation velocity-time profile and on at least a portion of the actual relative humidity-time profile over a time interval from a time when the food item is first affected by the deviation to the current sample real time;

the scheduled parameters include an environment temperature, air circulation velocity and relative humidity; and the predicted accumulated lethality delivered over the scheduled time interval is based on a second portion of the core temperature-time profile over the scheduled time interval, the second portion of the core temperature-time profile being based on the scheduled environment temperature, on the scheduled air circulation velocity and on the scheduled relative humidity.

8. A medium for data storage wherein is located a computer program for administering a continuous oven cooking process by controlling the oven to perform the continuous oven cooking process according to scheduled parameters; and in response to a deviation in a specific one of the scheduled parameters, identifying specific ones of the food items that have (a) currently predicted accumulated lethalities predicted to be delivered to them during the continuous oven cooking process that are less than a target lethality and/or (b) core temperatures at their cores at the end of the continuous oven cooking process that are less than a target core temperature.

9. A controller for administering a continuous oven cooking process in an oven on a continuous line of food items of food items, the controller comprising:

the data-storage medium of claim 8;

a CPU for executing the program in the data storage; and a bus, communicatively coupling the data storage and CPU.

10. A continuous oven cooking system comprising:

an oven for performing a continuous oven cooking process on a continuous line of food items; and the controller of claim 9, communicatively coupled to and for controlling the oven.

11. The medium of claim 8, wherein the specific one of the scheduled parameters is an environment temperature, air circulation velocity and/or relative humidity in a cooking zone of the oven through which the line of food items is conveyed.

12. A controller for administering a continuous oven cooking process in an oven on a continuous line of food items of food items, the controller comprising:

the data-storage medium of claim 11;

a CPU for executing the program in the data storage; and a bus, communicatively coupling the data storage and CPU.

13. A continuous oven cooking system comprising:

an oven for performing a continuous oven cooking process on a continuous line of food items; and the controller of claim 12, communicatively coupled to and for controlling the oven.

14. The medium of claim 8, wherein the computer program administers further by:

compiling an actual environment temperature-time profile, an actual air circulation velocity-time profile and an actual relative humidity-time profile for a cooking zone of the oven, and wherein the identifying step comprises the steps of:
selecting at least some of the food items affected by the deviation; and
for each of the selected food items that has been conveyed into the cooking zone during the deviation, simulating a core temperature-time profile for the core of the food item based on the actual environment temperature profile, the actual air circulation velocity-time profile and the actual relative humidity-time profile; and determining whether the core temperature-time profile satisfies the target temperature.

15. A controller for administering a continuous oven cooking process in an oven on a continuous line of food items of food items, the controller comprising:

the data-storage medium of claim 14;

a CPU for executing the program in the data storage; and a bus, communicatively coupling the data storage and CPU.

16. A continuous oven cooking system comprising:

an oven for performing a continuous oven cooking process on a continuous line of food items;

sensors to sense actual environment temperatures, actual air circulation velocities and actual relative humidities in a cooking zone of the oven; and the controller of claim 15, communicatively coupled to the oven and the sensors, for controlling the oven.

17. A controller for administering a continuous oven cooking process in an oven on a continuous line of food items of food items, the controller comprising:

the data-storage medium of claim 16;

a CPU for executing the program in the data storage; and a bus, communicatively coupling the data storage and CPU.

18. A continuous oven cooking system comprising:

an oven for performing a continuous oven cooking process on a continuous line of food items;

sensors to sense actual environment temperatures, actual air circulation velocities and actual relative humidities in a cooking zone of the oven; and the controller of claim 17, communicatively coupled to the oven and the sensors, for controlling the oven.

19. The medium of claim 8, wherein the computer program administers further by:

compiling an actual environment temperature-time profile, an actual air circulation velocity-time profile and an actual relative humidity-time profile for a cooking zone of the oven, and wherein the identifying step comprises the steps of:

selecting at least some of the food items affected by the deviation; and for each of the selected food items that has been conveyed into the cooking zone during the deviation, simulating a core temperature-time profile for the core of the food item based on the actual environment temperature profile, the actual air circulation velocity-time profile and the actual relative humidity-time profile;

computing the currently predicted accumulated lethality to be delivered to the food item during the continuous oven cooking process based on the core temperature-time profile; and determining whether the currently predicted accumulated lethality to be delivered to the food item satisfies the target lethality.

* * * * *